United States Patent
Kuhrt et al.

(10) Patent No.: US 12,469,492 B2
(45) Date of Patent: Nov. 11, 2025

(54) SPEECH CONTROL OF A MEDICAL APPARATUS

(71) Applicant: Siemens Healthineers AG, Forchheim (DE)

(72) Inventors: Soeren Kuhrt, Erlangen (DE); Stefan Rothbauer, Augsburg (DE); Lennart Kilian, Gauting (DE)

(73) Assignee: Siemens Healthineers AG, Forchheim (DE)

( * ) Notice: Subject to any disclaimer, the term of this patent is extended or adjusted under 35 U.S.C. 154(b) by 244 days.

(21) Appl. No.: 17/949,540

(22) Filed: Sep. 21, 2022

(65) Prior Publication Data

US 2023/0105362 A1    Apr. 6, 2023

(30) Foreign Application Priority Data

Sep. 23, 2021  (EP) ..................................... 21198529
Sep. 23, 2021  (EP) ..................................... 21198655

(51) Int. Cl.
*G10L 15/22*    (2006.01)

(52) U.S. Cl.
CPC ...... *G10L 15/22* (2013.01); *A61B 2560/0493* (2013.01); *G10L 2015/223* (2013.01)

(58) Field of Classification Search
CPC .............. G10L 15/22; G10L 2015/223; A61B 2560/0493
See application file for complete search history.

(56) References Cited

U.S. PATENT DOCUMENTS

| | | | | |
|---|---|---|---|---|
| 4,624,010 A | * | 11/1986 | Takebayashi | G10L 15/00 704/254 |
| 5,544,654 A | * | 8/1996 | Murphy | A61B 8/00 704/E15.044 |
| 5,754,978 A | * | 5/1998 | Perez-Mendez | G10L 15/32 704/239 |
| 6,591,239 B1 | | 7/2003 | McCall et al. | |
| 6,937,982 B2 | | 8/2005 | Kitaoka et al. | |
| 6,950,795 B1 | * | 9/2005 | Wong | G10L 15/22 704/E15.04 |
| 7,181,392 B2 | * | 2/2007 | Gandhi | G10L 15/01 704/235 |

(Continued)

FOREIGN PATENT DOCUMENTS

| CN | 101807399 A | 8/2010 |
|---|---|---|
| CN | 111816165 A | 10/2020 |

(Continued)

OTHER PUBLICATIONS

Salazar, George A. Considerations for Implementing Voice-Controlled Spacecraft Systems through a Human-Centered Design Approach. No. NASA/TM-2018-219980. 2018. (Year: 2018).*

(Continued)

*Primary Examiner* — Brian L Albertalli

(74) *Attorney, Agent, or Firm* — Harness, Dickey & Pierce, P.L.C.

(57) ABSTRACT

One or more example embodiments provides a method for speech control of a medical apparatus, a corresponding speech control apparatus, a medical system comprising the speech control apparatus, a computer program product and a computer-readable storage medium.

20 Claims, 4 Drawing Sheets

(56) References Cited

U.S. PATENT DOCUMENTS

| | | | |
|---|---|---|---|
| 8,224,653 B2 * | 7/2012 | De Mers | G10L 13/00 704/275 |
| 9,824,689 B1 * | 11/2017 | Shapiro | G10L 15/22 |
| 10,629,198 B2 | 4/2020 | George | |
| 10,896,675 B1 * | 1/2021 | Lam | G10L 15/30 |
| 2006/0242096 A1 | 10/2006 | Ozaki et al. | |
| 2011/0063429 A1 | 3/2011 | Contolini et al. | |
| 2011/0125503 A1 * | 5/2011 | Dong | G10L 21/0208 704/E15.001 |
| 2014/0006027 A1 | 1/2014 | Kim et al. | |
| 2014/0153747 A1 | 6/2014 | Contolini et al. | |
| 2014/0195247 A1 | 7/2014 | Parkinson et al. | |
| 2014/0278443 A1 | 9/2014 | Gunn et al. | |
| 2015/0154953 A1 | 6/2015 | Bapat et al. | |
| 2016/0125882 A1 * | 5/2016 | Contolini | H04R 3/005 704/231 |
| 2016/0275950 A1 * | 9/2016 | Ogawa | G10L 15/183 |
| 2017/0154627 A1 * | 6/2017 | Michel | G06F 3/16 |
| 2017/0194000 A1 * | 7/2017 | Itani | G10L 15/32 |
| 2017/0330560 A1 * | 11/2017 | Wang | G10L 15/183 |
| 2018/0218739 A1 | 8/2018 | Park et al. | |
| 2018/0357999 A1 | 12/2018 | Lee et al. | |
| 2019/0019514 A1 * | 1/2019 | Fava | A61F 9/00821 |
| 2019/0279640 A1 * | 9/2019 | Paul | G06F 3/167 |
| 2020/0029795 A1 | 1/2020 | Sly et al. | |
| 2020/0152190 A1 * | 5/2020 | Itkowitz | G10L 15/22 |
| 2020/0211558 A1 | 7/2020 | George | |
| 2020/0211573 A1 | 7/2020 | Bechtel et al. | |
| 2020/0243090 A1 | 7/2020 | Schneider et al. | |
| 2020/0286465 A1 | 9/2020 | Wang et al. | |
| 2020/0299795 A1 | 9/2020 | Campbell et al. | |
| 2021/0035580 A1 * | 2/2021 | Hille | G10L 15/32 |
| 2021/0153819 A1 * | 5/2021 | Hays | G16H 40/63 |
| 2023/0040869 A1 * | 2/2023 | Alanko | A61B 18/20 |
| 2023/0079180 A1 | 3/2023 | Kuhrt et al. | |
| 2023/0087504 A1 | 3/2023 | Rothbauer et al. | |
| 2023/0122461 A1 * | 4/2023 | Canady | G10L 15/22 704/251 |

FOREIGN PATENT DOCUMENTS

| | | |
|---|---|---|
| DE | 102006045719 B4 | 8/2008 |
| EP | 0201883 A2 | 11/1986 |
| JP | 4770374 B2 | 9/2011 |
| WO | WO 2017012242 A1 | 1/2017 |
| WO | WO 2021008035 A1 | 1/2021 |

OTHER PUBLICATIONS

ICEI IEC 62304; International Standard, First edition; May 2006; "Medical device software—Software life cycle processes" Reference No. CEI/IEC 62304:2006.

* cited by examiner

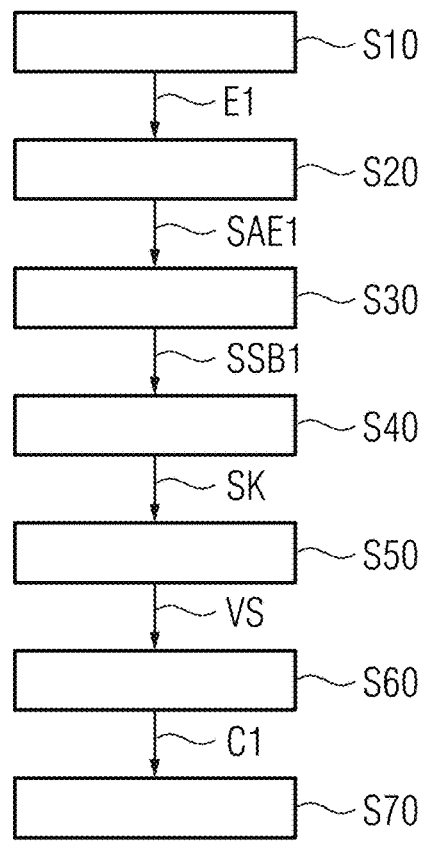
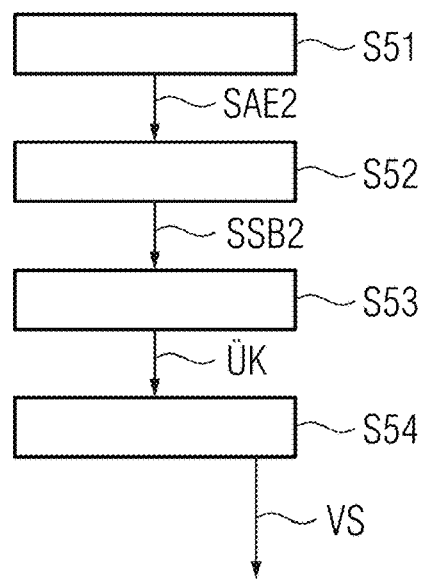

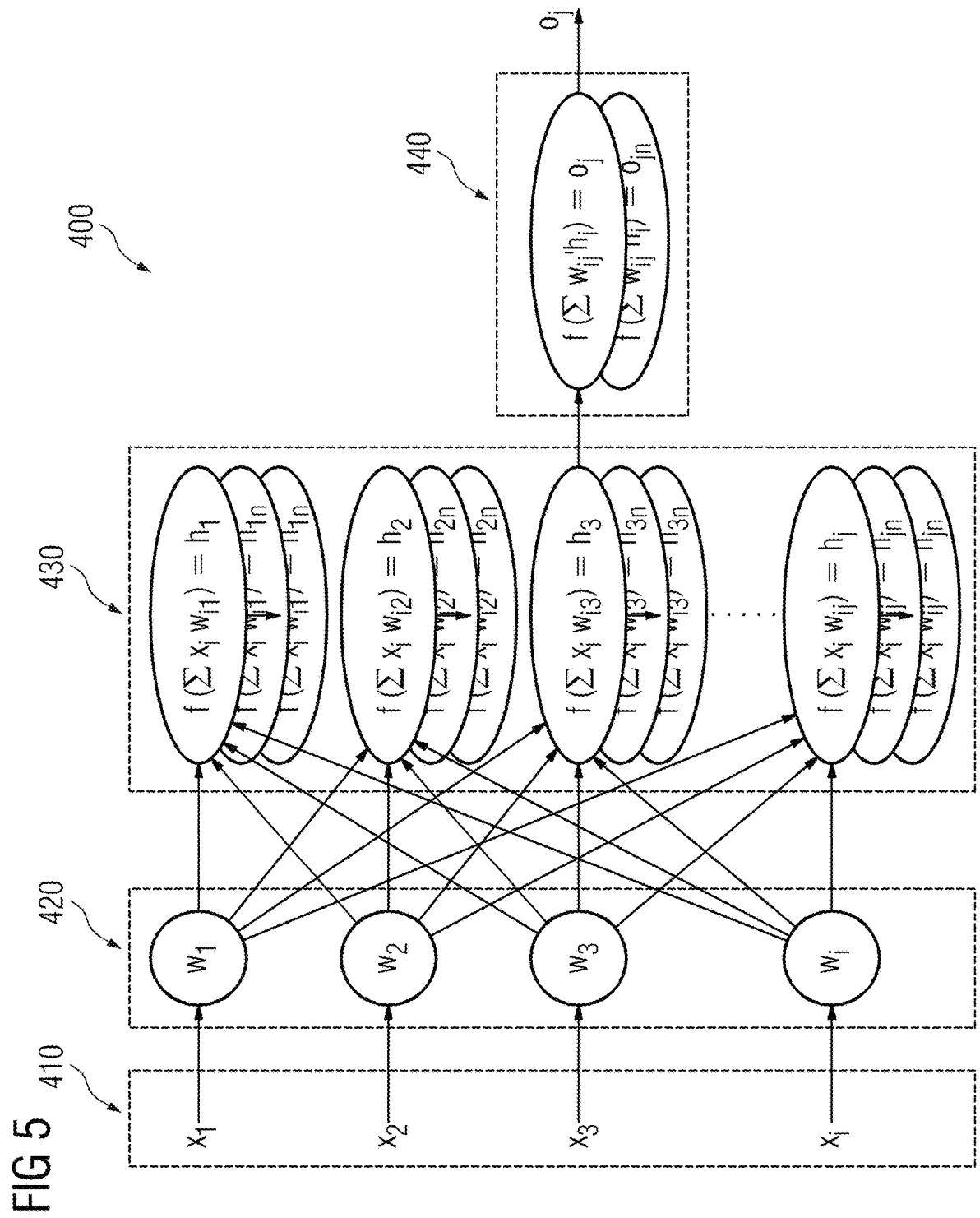

SPEECH CONTROL OF A MEDICAL APPARATUS

CROSS-REFERENCE TO RELATED APPLICATION(S)

The present application claims priority under 35 U.S.C. § 119 to European Patent Application No. 21198529.6, filed Sep. 23, 2021, and European Application No. 21198655.9, filed Sep. 23, 2021, the entire contents of each of which are incorporated herein by reference.

FIELD

One or more example embodiments of the present invention relates to a method for speech control of a medical apparatus by processing an audio signal containing operator speech input directed at controlling the apparatus. For example, one or more example embodiments relates to a method for first-failure safety speech control of a medical apparatus. One or more example embodiments of the present invention also relates to a corresponding medical system having a medical apparatus.

BACKGROUND

Medical apparatuses typically used to treat and/or examine and/or monitor a patient are, for example, imaging modalities such as magnetic resonance apparatuses, computed tomography apparatuses, PET apparatuses (positron emission tomography apparatuses) or interventional and/or therapeutic apparatuses, such as radiation-emitting or radio-therapeutic apparatuses. The treatment and/or examination of the patient is typically supported by operating staff.

Before and during the treatment and/or examination of a patient with such a medical apparatus, usually various settings have to be made on the medical apparatus, such as, for example, inputting patient data, setting various device parameters and the like. These steps are performed by the medical staff, wherein the settings of the medical apparatus are typically made via a physical user interface provided on the apparatus into which an operator can make entries.

In order to operate such medical apparatuses economically, a smooth workflow or process flow is desirable. In particular, making settings should be as easy as possible. A speech control system in which an operator transfers control commands via a natural speech signal to the medical apparatus is particularly suitable for this purpose. In this regard, DE 10 2006 045 719 B4 describes a medical system with a speech input apparatus with which specific functions of the system can be activated and deactivated via speech control. Herein, an audio signal captured with the speech input apparatus is processed by a speech analysis module in order to ascertain speech commands from an operator.

For speech control, i.e., the analysis or recognition of a user intention or a speech command formulated via natural speech, it is preferable to use artificial intelligence algorithms, preferably neural networks. These are particularly well suited for imaging a high-dimensional input space comprising a plurality of different speech sequences corresponding to natural speech input onto a target space comprising a number of defined control commands.

For approval, many medical apparatuses also have to meet the requirement of first-failure safety or functional safety, in order to ensure the safety of patients and operating staff at all times during the increasingly automated operation of the medical apparatus. First-failure safety means that no single first failure can have the result that the medical apparatus can become unsafe to use during its lifetime.

A particularly safety-critical control command is, for example, directed at releasing/starting X-radiation during image data capture or radiotherapy. Another example of a safety-critical control command relates to the (autonomous) adjustment movement of a medical apparatus or one of the components thereof, for example a robot arm, in space. Unauthorized or unconfirmed radiation release or apparatus movement can directly endanger the wellbeing of the patient or an operator.

For example, in the context of a medical procedure in the context of interventional radiology in which X-ray images have to be generated at different times via X-radiation, for reasons of sterility, the physician performing the intervention cannot effectively operate a manual control element, for example. It is either necessary to interrupt the workflow of the procedure in order to start X-ray image recording, or at least one further operator must be present in addition to the physician to take over the input of the corresponding control signal.

In order to embody hardware and/or control software of a medical apparatus for processing and converting control commands captured via any user interface in a functionally safe or first-failure safe manner, it is at present customary to request manual authorization of a recognized control command from an operator. One example of this is a so-called dead man grip. This switch/lever/grip has to be continuously actuated by an operator in order to carry out an automatic adjustment movement on a medical apparatus. The adjustment movement stops automatically when the operator releases the dead man grip. This to a large extent prevents a control command from being input randomly or unintentionally.

Alternatively, the medical apparatus can operate a second redundant software system on independent hardware, i.e., its own processor or own memory, to safeguard control software. The control command is only actually executed by the medical apparatus if the redundant software system checks the plausibility of the initially recognized control command, otherwise it is discarded.

However, in the field of speech control, there is currently still a fundamental lack of established and reliable methods for verifying the quality of speech recognition algorithms for functional or first-failure safety. This is in particular due to the fact that known methods for speech processing are still error-prone and non-deterministic. Therefore, there is a lack of universal criteria that a training data set of an (AI) speech recognition algorithm (AI=artificial intelligence) that ensures first-failure safety must satisfy, or a generally valid robustness measure for an (AI) speech recognition algorithm for the correct classification of speech input that has been altered, for example, by distortion or background noise. This is the subject of current research. This would be a mandatory requirement for the approval or certification of (AI) speech recognition algorithms. Even an approach based on existing safety standards for verifying a recognized speech command is not sufficiently safe or not possible because here there are again no conventionally defined requirements/criteria for AI speech recognition algorithms in order to verify that they have been satisfied. This would be a mandatory requirement for the approval or certification of (AI) speech recognition algorithms. In addition, the verification of a recognized speech command via an identical redundant speech recognition algorithm, which, in case of doubt, repeats the first failure, would not ensure first-failure safety.

SUMMARY

As a result, to date, speech control of medical apparatuses has only been used outside of safety-critical applications.

One or more example embodiments of the present invention solve this problem and provide means for speech control of a medical apparatus, which allows speech commands from an operator to be ascertained from an audio signal in an improved, i.e., more reliable, manner. In particular, one or more example embodiments provides means that ensure first-failure safety via speech control.

One or more example embodiments provides a method for speech control of a medical apparatus, a corresponding speech control apparatus, a medical system comprising the speech control apparatus, a computer program product and a computer-readable storage medium.

According to one or more example embodiments, a method for speech control of a medical apparatus comprises capturing an audio signal containing operator speech input for controlling the apparatus; first analyzing the audio signal for providing a first speech analysis result; recognizing a first speech command from the operator based on the first speech analysis result; ascertaining a verification signal for the first speech command, the ascertaining including, second analyzing the audio signal for providing a second speech analysis result, recognizing a second speech command from the operator based on the second speech analysis result, and comparing the first and second speech command, wherein the verification signal confirms the first speech command if the first speech command and the second speech command satisfy a conformity criterion; generating a control signal for controlling the medical apparatus based on the verification signal, wherein the control signal is for controlling the medical apparatus according to the first speech command; and inputting the control signal into the medical apparatus.

According to one or more example embodiments, a speech control apparatus for speech control of a medical apparatus comprises an interface configured to capture an audio signal containing operator speech input for controlling the apparatus; a first evaluation unit configured to analyze the audio signal and provide a first speech analysis result, recognize a first speech command based on the first speech analysis result; a second evaluation unit configured to ascertain a verification signal for the first speech command by analyzing the audio signal for providing a second speech analysis result, recognizing a second speech command from the operator based on the second speech analysis result, and comparing the first and second speech command, wherein the verification signal confirms the first speech command if the first speech command and the second speech command satisfy a conformity criterion; a control unit configured to generate a control signal for controlling the medical apparatus based on the verification signal provided that the first speech command has been verified based on the verification signal, wherein the control signal is suitable for controlling the medical apparatus according to the first speech command; and an interface configured to input the control signal into the medical apparatus.

BRIEF DESCRIPTION OF THE DRAWINGS

Features and advantages of one or more example embodiments of the present invention will become apparent from the following explanations of exemplary embodiments with reference to schematic drawings. Modifications mentioned in this context can in each case be combined with one another in order to form new embodiments. The same reference symbols are used for the same features in different figures.

FIG. 3 illustrates a schematic flow diagram of a method for controlling a medical apparatus according to one embodiment, FIG. 4 illustrates a further schematic flow diagram of a method for controlling a medical apparatus according to one embodiment, and FIG. 5 illustrates a neural network of a computational linguistics algorithm according to the invention in one embodiment.

DETAILED DESCRIPTION

Figure 1:
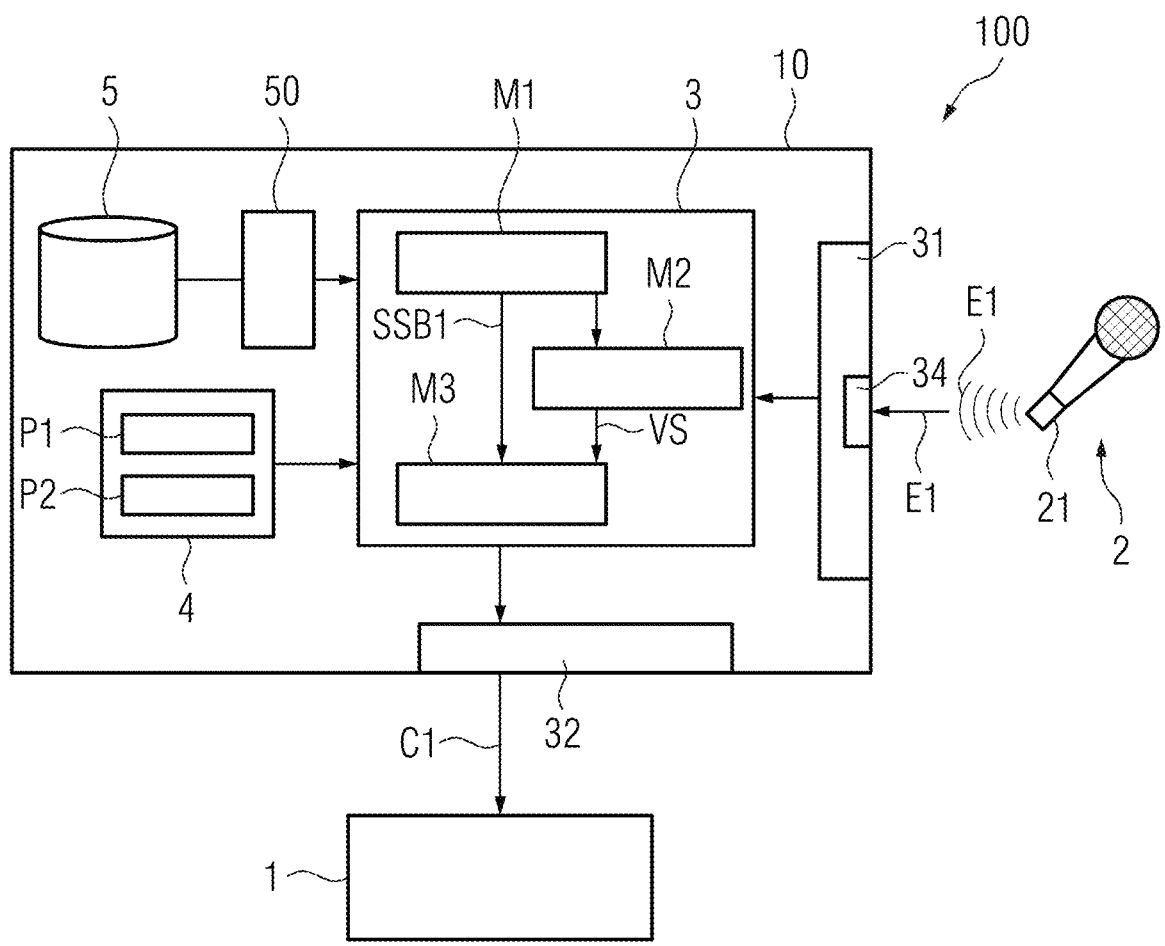
FIG. 1 illustrates a schematic block diagram of a system for controlling a medical apparatus according to one embodiment.

The following describes one or more example embodiments with reference to the claimed method and with reference to the claimed apparatuses. Features, advantages or alternative embodiments are likewise applicable to the other claimed subject matter and vice versa. In other words, physical claims (which are, for example, directed at a speech control apparatus) can also be developed with features described or claimed in connection with a method. Here, the corresponding functional features of the method are embodied by corresponding physical features, for example modules or units, of one of the apparatuses.

In a first aspect, the present invention relates to a method for speech control of a medical apparatus. In some embodiments, the method is embodied as a computer-implemented method. The method comprises a plurality of steps.

One step is at capturing an audio signal containing operator speech input directed at controlling the apparatus. One step is directed at analyzing the audio signal for providing a first speech analysis result. One step is directed at recognizing a first speech command based on the first speech analysis result. One step is directed at ascertaining a verification signal to confirm the first speech command.

Ascertaining the verification signal comprises substeps. One substep relates to analyzing the audio signal for providing a second speech analysis result. One substep relates to recognizing a second operator speech command based on the second speech analysis result. One substep relates to comparing the first and second speech command. The verification signal confirms the first speech command if the first speech command and the second speech command satisfy a conformity criterion.

A further method step is directed at generating a control signal for controlling the medical apparatus based on the verification signal and optionally the first speech command. This step is executed if the first speech command has been confirmed based on the verification signal. Herein, the control signal is suitable or embodied to control the medical apparatus according to the first speech command. A further step is directed at inputting the control signal into the medical apparatus.

For the purposes of one or more example embodiments of the present invention, an audio signal can in particular contain sound information. The audio signal can be an analog or digital or digitized signal. The digitized signal can be generated based on the analog signal, for example by an analog-to-digital converter. Accordingly, the step of capturing can comprise providing a digitized audio signal based on the received audio signal or digitizing the received audio signal. In some embodiments, the capturing of the audio signal can comprise registration of the audio signal via an input apparatus comprising a suitable sensor, for example an acoustic sensor in the form of a microphone, which can be a component of a user interface of the medical apparatus. The capturing of the audio signal can furthermore comprise providing the digital or digitalized signal for further analysis steps.

The audio signal can comprise a communication from a user (hereinafter also operator), for example an instruction to be executed or information regarding the instruction to be executed, for example speech control information. In other words, the audio signal can comprise operator speech input in natural speech. Natural speech is typically speech spoken by humans. Natural speech can include intonation and/or inflection to modulate communication, unlike formal speech, natural speech can include structural and lexical ambiguities.

For the purposes of one or more example embodiments of the present invention, analysis of an audio signal is directed at inferring or recognizing content of the operator speech input. The analysis can comprise recognizing a human voice. The analysis can comprise analyzing values of the speech input, such as, for example, frequency, amplitude, modulation or the like, which are characteristic of human speech. The result of the analysis is at least partially provided in the form of the first speech analysis result.

The analysis according to one or more example embodiments of the present invention can apply a method for processing natural speech. In particular, according to one or more example embodiments of the present invention, a first computational linguistics algorithm can be applied to the audio signal or the speech input. One possibility for processing speech input formulated in natural speech to provide the first speech analysis result is to convert the speech input formulated in natural speech into text, i.e., into structured speech, via a speech-to-text (software) module. Then, a further analysis for providing the first speech analysis result, for example via latent semantic analysis (or latent semantic indexing, LSI), can assign meaning to the text. In particular, herein, the audio signal is analyzed as a whole. Herein, it can be provided that individual words or word groups and/or syntax are recognized. The relationship/position of words or word groups to words or word groups appearing previously or later in the audio signal can also be taken into account. The analysis of the audio signal can in particular comprise a grammatical analysis, for example using a language or grammar model. Additionally or alternatively, operator inflection can be evaluated. In this way, one or more example embodiments of the present invention realizes understanding of the natural speech contained in the speech input (also called natural language understanding, NLU).

The step of recognizing a first speech command based on the first speech analysis result is directed at using the speech analysis result to assign a unique speech command to the meaning of the comprised text recognized in the speech input or to associate it with a predefined set of possible speech commands. Herein, in the step of recognizing the first speech command based on the speech analysis result, any number of different speech commands can be assigned to the speech input. Herein, each speech command is representative of an instruction for executing a work step, a defined action, operation or movement that is automatically executed by the medical apparatus based on the speech command. The recognition of the first speech command can comprise classification of the speech input based on the speech analysis result into a command class of a predefined set of different command classes. The predefined set of possible command classes can, for example, be present in the form of a command library. In particular, a plurality of speech input types that differ from one another or the individual speech analysis results thereof can be assigned to the same command class and thus to the same speech command according to their meaning.

In this way, the dimensionality of natural speech is taken into account in which inter alia one and the same user intention can be expressed via a different choice of words or inflection.

The command library can also comprise a command class for unrecognized speech commands which is assigned whenever the audio signal includes acoustic features which are non-specific for a concrete speech command or cannot be assigned to another command class.

The step of recognizing the first speech command can also be executed by applying the first computational linguistics algorithm. Herein, the step of recognizing the first speech command preferably follows the creation of a transcript (structured speech) of the speech signal or creation of a semantic analysis result based on the transcript. Both can be included in the first speech analysis result.

In some implementations, the large number of command classes is at least partially specific to the medical apparatus and is in particular directed at the functionality provided for the medical apparatus. In some implementations, the large number of command classes is embodied as adjustable and can in particular be adjusted via the selection or configuration or training of the computational linguistics algorithm used in the analysis. For example, further command classes can be added.

In a further step, a verification signal is ascertained to confirm the first speech command. In this step, it is checked whether the first identified speech command actually corresponds to the user intention desired by the operator or the desired command. Herein, the verification signal indicates a measure for the conformity between the desired user intention and the first speech command. In some implementations, the verification signal can comprise verification information. The verification information can assume at least two discrete values, for example '1' for complete conformity and '0' for no conformity, in some embodiments also a plurality of different discrete values, for example between '1' and '0'. Some of the discrete values can correspond to different conformity levels, which in each case can correspond to a proportional incomplete conformity. In some embodiments of the invention, these values can correspond to a sufficient conformity between the speech command and the desired user intention.

The step of ascertaining the verification signal is executed according to one or more example embodiments of the present invention in the following way:

The audio signal is analyzed in order to provide a second speech analysis result.

In this analysis, the content of the operator speech input is again recognized or inferred. This analysis can also comprise recognizing a human voice. The analysis can comprise analyzing values of the speech input, such as, for example, frequency, amplitude, modulation or the like, that are characteristic of human speech. The result of the analysis is at least partially provided in the form of the second speech analysis result.

Here, again, a method for processing natural speech can be used. In particular, here, a second computational linguistics algorithm can be applied to the audio signal or the speech input. In particular, the analysis can also comprise processing the speech input formulated in natural speech to provide the second speech analysis result, converting the speech input into text, i.e., into structured speech, via a speech-to-text (software) module. Then, a further analysis for providing the second speech analysis result, for example via latent semantic analysis (also called latent semantic indexing, LSI), can assign meaning to the text. Here, the audio signal is again analyzed as a whole. Herein, individual words or word groups and/or syntax can be recognized. The relationship/position of words or word groups to words or word groups that appear previously or later in the audio signal can also be taken into account. The analysis of the audio signal can in particular comprise a grammatical analysis, for example using a language or grammar model. Additionally or alternatively, the operator's inflection can be evaluated.

The step of recognizing the second speech command based on the second speech analysis result is also directed at assigning a unique speech command to the meaning of the comprised text recognized in the speech input on the basis of the second speech analysis result or associating it with a predefined set of possible speech commands. Herein, in the step of recognizing the second speech command based on the second speech analysis result, a defined set of different speech commands can be assigned to the speech input. Herein, each speech command is representative of a specific instruction for executing a work step, a defined action, operation or movement that is automatically executed by the medical apparatus based on the speech command.

The step of recognizing the second speech command can also be executed by applying the second computational linguistics algorithm. Herein, the step of recognizing the second speech command preferably follows the creation of a transcript (structured speech) of the speech signal or the creation of a semantic analysis result based on the transcript. Both can be included in the second speech analysis result.

According to one or more example embodiments of the present invention, the audio signal is analyzed a second time, in particular independently of the first analysis step, as will be described in more detail below, and a second speech analysis result is generated in order to provide a second speech command based thereon, which is then compared with the first speech command. In some embodiments, the first and second speech analysis result can differ, although both speech analysis results are generated based on the same audio signal. The first and the second speech command can also differ from one another. The reason for this is the different embodiment of the respective analysis steps for identifying the speech commands, as will be described in more detail below.

This is followed by a comparison of the first and second speech command, wherein the verification signal confirms the first speech command if the first speech command and the second speech command satisfy a conformity criterion. Therefore, according to one or more example embodiments of the present invention, the verification signal is based on a comparison between the first and second speech command. If conformity between the first and second speech command is ascertained, verification information confirming the first speech command is generated for the verification signal. Herein, ascertaining conformity between the first and second speech command corresponds to a test step or confirmation cycle for the first speech command according to one or more example embodiments of the present invention.

A conformity criterion can be embodied as a threshold value for the equality or similarity of the first and second speech command. The threshold value can assume a value of 100% indicative of an identity between the first and second speech command. However, the threshold value can also be less than 100%. The threshold value for the conformity criterion to be complied with can, for example, depend on a safety class or a safety requirement to which the first and/or second speech command is assigned or which is provided for the respective speech command in accordance with the work step to be executed. Accordingly, according to one or more example embodiments of the present invention, threshold values that are in particular dependent on the second speech command can be stored for the set of possible second speech commands, wherein the threshold values can represent a respective safely level corresponding to a safety class of a control command.

A safety class of a control command in each case stands for a safety measure or safely level which must be complied with when the work step, operation or maneuver corresponding to the respective control command is executed by the medical apparatus. A control command can also comprise speech commands which must also meet the specified safety requirements. Herein, the respective safety measure can be a safety measure defined via standardization. According to one or more example embodiments of the present invention, each speech command or each command class can be assigned to a safety class. In other words, according to one or more example embodiments of the present invention, there is a predetermined amount of different safety classes, in each case representing a different safety measure. Each possible speech command that can be identified as a first and/or second speech command, can accordingly be assigned to one of the safety classes according to its safety requirements. This assignment rule can be rule-based or defined in advance via a lookup table. A plurality of speech commands can be assigned to one safety class. In particular, at least one safety class can be provided that comprises safety-critical speech control commands, in particular speech control commands that are to feature first-failure safety. However, it is also possible for a plurality of safety classes to be provided for safety-critical speech commands corresponding to different safety-relevant safety levels. In particular, at least one safety class can also be provided for non-safety-critical speech commands or general speech input. The classification of the possible speech commands can be defined in advance in dependence on the medical apparatus, the functionalities thereof and/or corresponding safety specifications for the work steps to be controlled by speech commands.

According to one or more example embodiments of the present invention, after confirmation of the first speech command via the verification signal, the signal is provided for further processing, for example to a control unit of a speech control apparatus according to one or more example embodiments of the present invention. In this respect, the step of generating a control signal based on the verification signal and optionally the first speech command can comprise providing the same. The verification signal indicates whether or not the equality or similarity measure required for the first speech command has been achieved. If the first speech command is correspondingly confirmed via the verification signal, in a subsequent step, a control signal for controlling the medical apparatus is generated based on the first speech command and the verification signal and input into the medical apparatus.

In some embodiments of the invention, the steps directed at deriving the second speech command and comparing the first and second speech command can form a P-path that advantageously does not require any further user interaction. The steps directed at deriving the second speech command from one and the same audio signal and comparing the first and second speech command can take place at least partially parallel in time with the derivation of the first speech command. For example, in some implementations, the captured audio signal can be supplied to the first and second analysis step at the same time. In addition, the first and second speech command can be identified at the same time since the first and second computational linguistics algorithm are independent of one another and in particular implemented in different software/hardware environments. Alternatively, these steps for ascertaining the second speech command can be performed at a time after the derivation of the first speech command.

With the step of ascertaining the verification signal, the present invention advantageously applies monitoring or plausibility checking of a speech command, i.e., of a control command obtained via methods of machine speech analysis. In other words, with these steps, the present invention, enables the implementation of a test (P-protect) path for speech commands according to a first-failure safety system. If the first speech command is confirmed by the plausibility checking step (verification signal shows conformity), the first speech command is further processed and executed by the medical apparatus. If the first speech command is not confirmed by the plausibility checking step (verification signal shows a discrepancy), the process is aborted and the first speech command is discarded and not executed.

With the ascertaining of the verification signal, one or more example embodiments of the present invention advantageously makes it possible to prevent the execution of user input that has been incorrectly recognized or incorrectly interpreted via machine speech recognition. In particular, in this way the safety-critical or first-failure safety execution of control commands is ensured. The first speech command recognized is only executed if it has been confirmed via the plausibility checking step.

Therefore, in some embodiments of the invention, the verification signal is advantageously ascertained in a separate independent hardware and/or software system. In particular, therefore, the verification signal is ascertained independently of the other process steps. Algorithms for ascertaining the verification signal in particular differ from the computational linguistics algorithms previously used in the method. In some embodiments of the invention, the step of ascertaining the verification signal is executed in another real or virtual computing unit than the previous process steps. As a result, according to one or more example embodiments of the present invention, a first-failure safety system comprising a control path (C-path, C-control) and a test path (P-path, P-protect) can be set up wherein the step of ascertaining the verification signal takes place within the safeguarded P-path. In particular, the steps of capturing an audio signal containing operator speech input directed at controlling the apparatus, first analysis of the audio signal for providing a first speech analysis result and recognizing a first speech command based on the first speech analysis result form an essential part of the C-path.

As mentioned in the introduction, in further preferred implementations of one or more example embodiments of the present invention, analysis to provide the first speech analysis result comprises applying a first computational linguistics algorithm. This can preferably comprise a first trained function applied to the audio signal. The analysis to provide a second speech analysis result further comprises applying a second computational linguistics algorithm comprising a second trained function applied to the audio signal. Herein, the first trained function and second trained function differ from one another.

Namely, in a preferred development, the second trained function is embodied only to recognize safety-critical speech commands.

Herein, a safety-critical speech command is representative of a defined work step, an action, operation or movement that is to be executed automatically by the medical apparatus based on the speech command and must meet the defined safety requirements, in particular standardized safety requirements. Safety-critical speech commands in particular also comprise first-failure safety speech commands. First-failure safety speech commands should be understood as the safety-critical speech commands with the highest safety requirements. In some implementations, safety-critical speech commands can be assigned to exactly one or a large number of safety classes, wherein in the latter case, as a subset of all possible speech commands, the safety-critical speech commands can have different safety levels.

Safety-critical speech commands to be recognized by the second computational linguistics algorithm typically have a characteristic feature combination, i.e., a characteristic acoustic signal curve, frequency pattern, amplitude, modulation or the like. They can also have a characteristic sequence of letters and or words that is easy to distinguish. Safety-critical speech commands, in particular first-failure safety speech commands, can, for example, be characterized by a minimum number of syllables, for example three or more. Or, they have unique phonetic features, i.e., phonetic features that can hardly be confused, so that similarity to other speech commands or other speech input in general and the associated risk of confusion is minimized from the outset. The named properties or features of the audio signal can be captured in the steps of analyzing of the audio signal and provided according to one or more example embodiments of the present invention as a speech analysis result.

Accordingly, in a preferred implementation of one or more example embodiments of the present invention, the second trained function is embodied to use the second tokenization information and/or the second semantic information, or more generally to use the second speech analysis result to identify structurally and/or lexically unique speech commands as safety-critical speech commands.

According to one or more example embodiments of the present invention, at least the second computational linguistics algorithm ascertains structural properties and/or lexical properties of the audio signal. Therefore, according to one or more example embodiments of the present invention, characteristic, unique structural and/or lexical properties are linked to safety-critical speech commands. Consequently, according to one or more example embodiments of the present invention, precisely these unique properties are assigned to safety-critical speech commands in advance in order to be able to easily and reliably identify safety-critical speech commands as such. In other words, according to one or more example embodiments of the present invention, audio signals corresponding to reliably identifiable safety-critical speech commands can be specified based on characteristic structural and lexical properties/features.

In this sense, in a particularly preferred embodiment, the second trained function is embodied to identify a speech command with at least three, preferably four, syllables as a safety-critical speech command. Here, one or more example embodiments of the present invention assumes that the risk of confusing a speech command decreases with the number of syllables captured. Therefore, particularly preferably, safety-critical work steps of the apparatus are assigned speech commands comprising at least three syllables, particularly preferably speech commands comprising five to seven syllables.

Therefore, the first computational linguistics algorithm comprises a first trained function that is applied to the audio signal for analysis. The trained function should be understood as a trained machine learning algorithm. Preferably, the recognition of a first speech command based on the first speech analysis result and the assignment of the first speech command to a safety class also comprise applying the first computational linguistics algorithm.

Preferably, the trained function or the trained machine learning algorithm comprises a neural network, preferably a convolutional neural network. A neural network is substantially structured like a biological neural network, for example like the human brain. Preferably, an artificial neural network comprises an input layer and an output layer. In between, it can comprise a large number of intermediate layers. Each of the layers comprises one, preferably a large number of nodes. Herein, each node is considered to be a biological computing unit or switching point, for example a neuron. In other words, a single node corresponds to a specific computing operation applied to the input data. Nodes in one layer can be connected to one another via corresponding edges or connections and/or to nodes in other layers, especially via directed connections. These edges or connections define the network data flow. In preferred embodiments, an edge/connection is equipped with a parameter, wherein the parameter is also to referred to as "weight". This parameter regulates the influence or weight of the output data of a first node for the input of a second node that is in contact with the first node via the connection.

According to some embodiments of the invention, the neural network is a trained network. The training of the neural network is preferably performed in the sense of 'supervised learning' based on training data of a training data set, namely known pairs of input and output data. Herein, the known input data is passed as input data to the neural network and the output data of the neural network is compared with the known output data of the training data set. The artificial neural network now learns independently and adjusts the weights of the individual nodes or connections in such a manner and for such a time until the output data in the output layer of the neural network is sufficiently similar to the known output data of the training data set. In this context, in the case of convolutional neural networks, reference is also made to 'deep learning'. The terms 'neural network' and 'artificial neural network' can be understood to be synonyms.

According to the invention, in some embodiments, the convolutional neural network, i.e., the trained function of the first computational linguistics algorithm, is trained in a training phase to analyze the captured audio signal and to recognize a first speech command or a command class according to the first speech command therefrom. The first speech command and/or the command class then corresponds to the output data of the trained function.

Speech commands corresponding to the group of control commands to be recognized by the first computational linguistics algorithm can have a large number of acoustic structural and/or lexical feature combinations, i.e., a large number of different combinations of frequency patterns, amplitudes, modulations, words, word sequences, syllables or the like. Accordingly, in the training phase, the trained function learns to assign one of the possible speech commands or to classify the audio signal according to one of the command classes or to classify the audio signal according to a safety class based on a feature combination extracted from the audio signal in the sense of the first speech analysis result. The training phase can also comprise manual assignment of training input data in the form of speech input to individual speech commands or command classes. The first trained function is trained to a recognize a set of audio signals that is as broad and diverse as possible comprising human speech as a speech command on a predefined, in particular large, set of command classes.

A first group of neural network layers can be directed at extracting or ascertaining the acoustic features of the audio signal, i.e., the provision of the first speech analysis result comprising a combination of acoustic features specific to the audio signal. The first speech analysis result can be provided in the form of an acoustic feature vector. In this respect, a speech data stream, preferably comprising the audio signal in its entirety, is used as input data for the neural network. The first speech analysis result can be used as input data for a second group of neural network layers, also referred to as the 'classifier'. The second group of neural network layers is used to assign at least one speech command or command class to the extracted feature vector. Herein, the set of command classes can in particular also comprise a command class for non-recognized speech commands. Accordingly, the neural network can be trained to assign the audio signal to this class if no speech command can be uniquely recognized based on the features.

The analysis steps or functions can also be executed by a plurality of, in particular two or three, independent, neural networks. Consequently, the first computational linguistics algorithm can comprise one or more neural networks. For example, feature extraction can be executed with a first neural network and classification with a second neural network.

The classification of an audio signal into a command class based on the first speech analysis result can be based on a comparison of the extracted feature vector of the audio signal with feature vectors stored in the command library that are specific to each command class. One or more feature vectors can be stored for a command class in order to account for the multidimensionality of human speech and to be able to identify a concrete speech command based on a large number of different types of speech input.

The comparison of the feature vectors can comprise an individual comparison of individual features, preferably all features, included in the feature vectors. Alternatively or additionally, the comparison can be based on a feature parameter derived from the feature vector that takes account of individual features. The conformity measure for the feature vectors or feature parameters resulting from the comparison indicates which speech command or which command class is assigned. The command class that has the greatest similarity or a similarity above a defined threshold value is assigned.

The threshold value for the defined similarity measure can be preset automatically or by an operator. It can furthermore depend on the specific feature combination recognized for the audio signal. The threshold value can represent a large number of individual threshold values for individual features of the feature vector or a universal threshold value taking into account the large number of individual features included in the feature vector.

The further analysis of the audio signal can now comprise applying a second computational linguistics algorithm comprising a second trained function to the audio signal.

Preferably, the recognition of the second speech command based on the second speech analysis result also comprises applying the second computational linguistics algorithm. The comparison of the first and second trained function can be executed via the second trained function. The first and second trained function are different trained functions according to one or more example embodiments of the present invention.

As mentioned in the introduction, in some implementations, the second trained function is embodied only to identify safety-critical speech commands in the audio signal. In this sense, the second trained function or the second computational linguistics algorithm is specific to safety-critical speech commands also comprising first-failure safety speech commands.

The step of recognizing the second speech command based on the second speech analysis result is in particular directed at associating the second speech analysis result with a predefined set of safety-critical speech commands, in particular first-failure safety speech commands. Therefore, the recognition of the second speech command also comprises the recognition of a safety-critical speech command, in particular a first-failure safety speech command.

The second trained function or the second trained machine learning algorithm also comprises a neural network, which can basically be embodied as described with reference to the first trained function.

According to some embodiments of the invention, the second neural network is also a trained network. The training of the neural network is preferably performed in the sense of 'supervised learning' based on training data of a training data set, namely known pairs of input and output data, as described above. Therefore, according to the invention, in some embodiments, the second neural network, i.e., the second trained function of the second computational linguistics algorithm is trained in a training phase to analyze the captured audio signal and to identify therefrom a second speech command as a safety-critical speech command, in particular first-failure safety speech command from a set of safety-critical speech control commands. In some embodiments, the second speech command can correspond to the output data of the second trained function. In other embodiments, the second trained function also takes over the step of comparing the first and second speech command.

Safety-critical speech commands to be recognized by the second computational linguistics algorithm have a characteristic feature combination as described in the introduction. This in particular differs from the feature combination of the speech commands that are to be recognized by the first computational linguistics algorithm. Safety-critical speech commands, in particular first-failure safety speech commands, have unique, hardly confusable, phonetic lexical or structural features that can hardly be confused with features of other speech commands.

Accordingly, in the training phase, the second trained function also learns to assign one of the safety-critical speech commands based on a feature combination extracted from the audio signal in the sense of the second speech analysis result. The training phase can also comprise manual assignment of training input data in the form of speech input to individual speech commands.

As with the first trained function, a first group of neural network layers can also be directed at extracting or ascertaining the acoustic features of an audio signal and providing the second speech analysis result with the second trained function. Reference is made to the previous description, which is also applicable here. The second speech analysis result can also be used as an input data set for a second group of neural network layers, the 'classifier', which assigns one of the safety-critical speech commands to the second speech analysis result. The second trained function can advantageously be embodied to assign a failure output to the second speech command if no safety-critical speech command was recognized. If the second trained function does not recognize a safety-critical speech command, the first speech command is always discarded in the interest of human and device safety.

Here, once again, the individual functions can alternatively be executed by a plurality of, in particular two, independent neural networks.

The classification of the audio signal into one of the safety-critical speech commands, in particular first-failure safety speech commands, based on the second speech analysis result can also be based on a comparison of an extracted, second feature vector of the audio signal with a large number of feature vectors specific to and stored for each safety-critical speech command. For each safety-critical speech command, in particular first-failure safety speech command, in some embodiments of the invention, exactly one feature vector is stored in order to take account of safety requirements for safety-critical actions or movements of the medical apparatus. The comparison of the feature vectors can comprise an individual comparison of individual, preferably all, features included in a feature vector. Alternatively or additionally, the comparison can be based on a feature parameter derived from the respective feature vector, which takes account of a subset or all individual features. The conformity measure emerging from the comparison for the feature vectors or feature parameters indicates which safety-critical speech command is assigned or that no safety-critical speech command was recognized. The safety-critical speech command assigned as the second speech command is the one with the greatest similarity or a similarity above a defined threshold value. Otherwise, reference is made to the statements relating to the first trained function.

If the second computational linguistics algorithm does not recognize a safety-critical speech command, the first and second speech command are not compared and a verification signal is created that indicates that no second speech command is present. The method is aborted and the first speech command is discarded. If the second trained function recognizes a safety-critical speech command, the first and second speech command are compared. If the comparison does not identify any conformity of the two speech commands, a verification signal is generated that does not confirm the first speech command and this is likewise discarded. Only if the comparison indicates sufficient conformity of the two speech commands is a verification signal generated that confirms the first speech command.

The second trained function can be furthermore trained, in particular with the second group of neural network layers, to derive keywords, word sequences or command triggers from the feature vector. Therefore, the second group of neural network layers is used to assign a unique keyword to the acoustic feature vector. For this purpose, one or a few keywords can be stored in relation to a safety-critical speech command, for example one or two keywords that are uniquely assigned to a safety-critical speech command.

Keywords are in particular short words or word sequences with, for example, three or four syllables. Specific acoustic feature vectors can also be stored for the keywords of the individual command classes. Accordingly, the neural network of the second computational linguistics algorithm can be trained, in particular via the second group of neural network layers, to perform a comparison between the feature vector extracted from the audio signal and the stored feature vectors corresponding to the keywords assigned in each case. Herein, the comparison can be executed as already described with reference to the first trained function. If a keyword is recognized in the audio signal, the corresponding safety-critical speech command is assigned. If the second trained function does not ascertain conformity with one of the stored keywords, no second speech command is generated.

Whereas the first trained function is trained to recognize a set of audio signals that is as broad and diverse as possible as a speech command on a predefined, in particular large, set of command classes, the further trained function is trained to identify a few keywords in audio signals.

Therefore, a key difference between the first and second trained function can in particular lie in the nature or scope of the training data. The first trained function is trained with a first training data set which, in some embodiments, comprises a broad and diverse set of audio signals comprising human speech and the different speech commands assigned in each case corresponding to a large number of different command classes. The first training data set can also comprise speech input that cannot be assigned to any command class. On the other hand, the second trained function is trained with a second training data set that is limited to specific concrete safety-critical speech commands, in particular first-failure safety speech commands, i.e., phonetically lexically unique and/or structurally unique speech commands, that are difficult to confuse. Consequently, in some embodiments, the second training data set comprises different audio signals and the corresponding safety-critical speech commands in each case. In particular, in some embodiments, the second training data set is a subset of the first training data set, wherein, in some embodiments, the subset may only relate to first-failure safety speech commands. In this respect, according to one or more example embodiments of the present invention, the second trained function can be trained via a small training vocabulary and, in contrast, the first trained function can be trained with a large training vocabulary.

A further difference between the first and second trained function can be in the embodiment of the verification function or the classification function, which is preferably executed via the second group of neural network layers. Whereas the first trained function is embodied to classify a speech input into a wide number of different speech commands corresponding to a wide variety of different categories, the second trained function is embodied to classify speech input into only a small set of safety-critical speech commands corresponding to a small number of categories.

In particular, according to one or more example embodiments of the present invention, the first trained function and the second trained function differ in the nature or type of neural network used in each case. In this way, it is, for example, possible to reduce the risk of occurrence of similar systematic failures in speech command recognition by the first trained function and the second trained function.

Particularly preferably, speech recognition algorithms that are known and available per se can be used with the first trained function. In some implementations of one or more example embodiments of the present invention, the second trained function corresponds to a speech recognition algorithm generated in the context of a secure, for example manufacturer's, software development process.

Whereas the first trained function can, for example, be embodied as a feedforward network, the second trained function can, for example, be embodied as a recurrent or feedback network in which nodes of a layer are also linked to themselves or to other nodes in the same and/or at least one previous layer.

According to some implementations, the first computational linguistics algorithm can be implemented as a so-called front-end algorithm hosted, for example, in a local computing unit of the medical apparatus or in a local speech recognition module. As a front-end, the processing can in particular take place effectively in real time so that the result can be obtained with virtually no significant time delay. Accordingly, the second computational linguistics algorithm can be implemented as a so-called back-end algorithm hosted, for example, in a remote computing facility, such as, for example, a real server-based computing system or a virtual cloud-computing system. In a back-end implementation, it is in particular possible to use complex analysis algorithms requiring high computing power. Accordingly, the method can comprise transmitting the audio signal to a remote computing facility and receiving one or more analysis results from the remote computing facility. In alternative implementations, the second computational linguistics algorithm can also be implemented as a front-end algorithm. Conversely, the first computational linguistics algorithm can also be implemented as a back-end algorithm.

According to a large number of preferred implementations of one or more example embodiments of the present invention, analyzing the audio signal comprises tokenizing for segmenting letters, words and/or sentences within the audio signal via the first and second computational linguistics algorithm. Herein, the first and second speech command are recognized based on the first speech analysis result comprising first tokenization information and the second speech analysis result comprising second tokenization information.

In some embodiments of the invention, only the first or second computational linguistics algorithm can execute tokenization. In particular, a first network layer of the first and/or second trained function in each case can be embodied to tokenize the audio signal.

In computational linguistics, tokenization refers to the segmentation of text into units at letter, word and sentence level. According to some implementations, tokenization can comprise converting speech contained in the audio signal into text. In other words, a transcript can be created and then tokenized. For this purpose, it is possible to use a plurality of methods that are known per se, based, for example, on the use of formant analysis, hidden Markov models, neural networks, electronic dictionaries and/or language models. This analysis step is preferably executed via the first, second and/or the further trained function, as described in the introduction.

The first and/or second speech analysis result can comprise first or second tokenization information. The use of tokenization information enables account to be taken of the structure of speech input for ascertaining a speech command or a user intention in general.

According to some particularly preferred implementations, the analysis of the audio signal comprises semantic analysis of the audio signal via the first and second computational linguistics algorithm. Herein, the first and second speech command are identified based on the first speech analysis result comprising first semantic information and the second speech analysis result comprising second semantic information.

In some embodiments of the invention, only the first or second computational linguistics algorithm can also execute a semantic analysis of the audio signal. In particular, the first network layer of the first and/or second trained function in each case can be embodied to analyze the audio signal semantically.

Semantic analysis is aimed at inferring the meaning of the operator speech input. In particular, semantic analysis can comprise an upstream speech recognition step (speech to text) and/or a tokenization step.

According to some implementations, the semantic information indicates whether or not the audio signal contains one or more user intentions. Herein, the user intention can in particular be operator speech input directed at one or more relevant speech commands. Herein, the speech commands can in particular be speech commands relevant for controlling the medical apparatus. According to some implementations, the semantic information indicates or contains at least one property of a user intention contained in the audio signal. Therefore, the semantic analysis is used to extract certain acoustic characteristics or properties from the speech input that can be taken into account or be relevant for the determination of a speech command.

In further implementations, a method according to one or more example embodiments of the present invention also comprises classifying at least the first speech command into a safety class from a large number of safety classes, wherein at least one of the plurality of safety classes is provided for safety-critical speech commands. Here, the verification signal for the first speech command is ascertained if it has been assigned to the safety class for safety-critical speech commands. Therefore, the verification step is preferably executed if the first speech command has been classified corresponding to a safety class for safety-critical speech commands. As mentioned in the introduction, in some implementations, safety-critical speech commands comprise speech commands whose execution by the medical apparatus, must in particular be embodied as first-failure safe.

In some implementations, a speech command or a command class is assigned to a safety class based on a predefined assignment rule that takes into account the type of speech command or a degree of risk of the operation or action or movement of the medical apparatus to be triggered by the speech command to the patient and/or the operating staff and/or the medical apparatus or to other medical equipment. In some implementations, the assignment takes place via a predetermined lookup table. In further implementations, predefined keywords can be provided which can be recognized by the first computational linguistics algorithm in the audio signal and which are in each case linked to one of the safety classes. Herein, one or more keywords can be assigned to a safety class. In some embodiments, therefore, a safety class is assigned to the first speech command if one or more keywords have been recognized by the first computational linguistics algorithm in the audio signal. Alternatively, the safety class can be automatically defined by a predefined assignment rule when the first speech command is recognized.

Consequently, the step of assigning the first speech command to a safety class is directed at identifying the first speech command as a safety-critical speech command, in particular as a first-failure safety, or non-safety-critical speech command. In some implementations, this step is also executed by the first computational linguistics algorithm, preferably the first trained function. Therefore, the first trained function can be trained to assign a safety class to the first speech command. Then, the output data of the trained function of the first computational linguistics algorithm can also comprise the safety class. In particular, a third group of neural network layers can be embodied to assign a safety class based on the command class and/or the recognized first speech command, wherein in particular the ascertained command class and/or the first speech command are used as input data for the third group of neural network layers. The third group is now embodied to classify the command class and/or the recognized speech command as a safety-critical command, in particular as a first-failure safety command or non-safety-critical command.

In some embodiments of the invention, the recognition of the first speech command as a safety-critical speech command is a prerequisite for ascertaining a verification signal.

In other preferred implementations, capturing the audio signal comprises capturing the audio signal via a first input apparatus and a second input apparatus, wherein the first and second input apparatus are different from one another. Here, capturing also comprises providing the audio signal captured via the first input apparatus for analyzing and providing the first speech analysis result and providing the audio signal captured via the second input apparatus for analyzing and providing the second speech analysis result.

In this embodiment, the audio signal is captured via two redundant input apparatuses, for example two independent microphones. Therefore, failures that may occur during signal capturing, i.e., during registration, digitization and/or storage of the speech input in one of the input apparatuses, can only propagate into the derivation of the first or the second speech command, but in all likelihood not in both.

According to a further aspect, one or more example embodiments of the present invention provides a speech control apparatus for speech control of a medical apparatus. The speech control apparatus comprises at least one interface for capturing an audio signal containing operator speech input directed at controlling the apparatus.

The speech control apparatus furthermore comprises a first evaluation unit embodied to analyze the audio signal and to provide a first speech analysis result and to recognize a first speech command based on the first speech analysis result. The first evaluation can also be embodied to assign the first speech command to a safety class, wherein at least one safety class is provided for safety-critical speech commands. The speech control apparatus also comprises a second evaluation unit embodied to ascertain a verification signal for the first speech command and provide it for further processing. The second evaluation unit is in particular embodied to analyze the audio signal for providing a second speech analysis result, to recognize a second operator speech command based on the second speech analysis result and to compare the first and second speech command, wherein the verification signal confirms the first speech command if the first speech command and the second speech command satisfy a conformity criterion. The speech control apparatus further comprises a control unit embodied to generate a control signal for controlling the medical apparatus based on the verification signal and possibly the first speech command and provided that the first speech command has been confirmed based on the verification information. Herein, the control signal is suitable for controlling the medical apparatus according to the first speech command. The speech control apparatus also comprises an interface for inputting the control signal into the medical apparatus. The two interfaces can be embodied as an integral input and output interface.

For the purposes of one or more example embodiments of the present invention, a medical apparatus is in particular a physical medical apparatus. The medical apparatus is typically used to treat and/or examine a patient. The medical apparatus can in particular be embodied to perform and/or support a medical procedure. The medical procedure can comprise an imaging and/or interventional and/or therapeutic procedure, but also monitoring of a patient. In particular, the medical apparatus can comprise an imaging modality, such as, for example, a magnetic resonance device, a single-photon emission computed tomography device (SPECT device), a positron emission tomography device (PET device), a computed tomography device, an ultrasound device, an X-ray device or an X-ray device embodied as a C-arm device. The imaging modality can also be a combined medical imaging device comprising any combination of several of the aforementioned imaging modalities. Furthermore, the medical apparatus can include an interventional and/or therapeutic apparatus, such as, for example, a biopsy apparatus, a radiation-emitting or radiotherapeutic apparatus for irradiating a patient, and/or an interventional apparatus for performing an intervention, in particular a minimally invasive, intervention. According to further implementations, the medical apparatus can additionally or alternatively comprise patient monitoring modules, such as, for example, an ECG device, and/or a patient care device, such as, for example, a ventilator, an infusion device and/or a dialysis device. Herein, in some embodiments the treatment and/or examination and/or monitoring of the patient via the medical apparatus is typically supported by an operator, for example nursing staff, technical staff, X-ray assistants or physicians.

The first and second evaluation unit and the control unit can be embodied as one or more central and/or decentralized computing units. The computing unit(s) can in each case have one or more processors. A processor can be embodied as a central processing unit (CPU/GPU). In particular, the first and/or the second evaluation unit and the control unit can in each case be implemented as a part or module of a medical apparatus to be controlled by speech input. In some implementations, the evaluation units can be embodied in each case as a submodule of the control unit or vice versa. Alternatively, the at least one evaluation unit can be implemented as a local or cloud-based processing server. Furthermore, the at least one evaluation unit can comprise one or more virtual machines.

In a preferred implementation, the first and second evaluation unit are embodied as separate computing units. This means that, as described in the introduction, the two evaluation units are in each case implemented on separate hardware or in different software modules. In this way, the speech control apparatus is configured to feature the conventional control-protect (CP) structure of a first-failure safety control system for control commands in the form of speech input in which the first evaluation unit forms part of the control path (C-path) and the second evaluation unit forms the test path (P-path).

The interface of the speech control apparatus can be generally embodied for data exchange between the speech control apparatus and further components and/or for data exchange between components or modules of the speech control apparatus. Insofar, the interface can be implemented in the form of one or more individual data interfaces, which may have a hardware and/or software interface, for example a PCI bus, a USB interface, a FireWire interface, a ZigBee interface or a Bluetooth interface. The interface can furthermore have an interface of a communication network, wherein the communication network can have a local area network (LAN), for example an intranet or a wide area network (WAN). Accordingly, the one or more data interfaces can have a LAN interface or a wireless LAN interface (WLAN or WIFI). The interface can furthermore be embodied to communicate with the operator via a user interface. Accordingly, the interface can be embodied to display speech commands via the user interface and to receive related user input via the user interface. In particular, the interface can comprise an acoustic input apparatus for registering the audio signal and, in some embodiments, an acoustic output apparatus for outputting an audio signal comprising a prompt to confirm the first speech command.

In a further preferred implementation, the interface comprises a first and a second input apparatus for simultaneously capturing the audio signal. Systematic or random failures in the audio signal capture are limited to one of the evaluation paths for ascertaining the first and second speech command.

The advantages of the proposed apparatus substantially correspond to the advantages of the proposed method. Features, advantages or alternative embodiments/aspects can likewise be applied to the other claimed subject matter and vice versa.

According to a further aspect, one or more example embodiments of the present invention provides a medical system comprising the speech control apparatus according to one or more example embodiments of the present invention and a medical apparatus for performing a medical procedure.

In a further aspect, one or more example embodiments of the present invention relates to a computer program product, which comprises a program and can be loaded directly into a memory of a programmable computing unit, and program means, for example libraries and auxiliary functions, for executing a method for speech control of a medical apparatus in particular according to the aforementioned implementations/aspects when the computer program product is executed.

Furthermore, in a further aspect, one or more example embodiments of the present invention relates to a computer-readable storage medium on which readable and executable program sections are stored for executing all the steps of a method for speech control of a medical apparatus according to the aforementioned implementations/aspects when the program sections are executed by a computing unit.

Herein, the computer program product can comprise software with a source code, which still has to be compiled and linked or only has to be interpreted, or an executable software code that only needs to be loaded into the computing unit for execution. The computer program product enables the methods according to one or more example embodiments of the present invention to be executed quickly, identically repeatedly and robustly. The computer program product is configured such that it can execute the method steps according to one or more example embodiments of the present invention via the computing unit. Herein, the computing unit must in each case fulfill the requisite conditions, such as, for example, having a corresponding random-access memory, a corresponding processor, or a corresponding logic unit so that the respective method steps can be executed efficiently.

The computer program product is, for example, stored on a computer-readable storage medium or held on a network or server from where it can be loaded into the processor of the respective computing unit, which can be directly connected to the computing unit or embodied as part of the computing unit. Furthermore, control information of the computer program product can be stored on a computer-readable storage medium. The control information of the computer-readable storage medium can be embodied such that it carries out a method according to one or more example embodiments of the present invention when the data carrier is used in a computing unit. Examples of computer-readable storage media are DVDs, magnetic tapes or USB sticks on which electronically readable control information, in particular software, is stored. When this control information is read from the data carrier and stored in a computing unit, embodiments/aspects according to the invention of the above-described methods can be performed. Thus, one or more example embodiments of the present invention can also be based on said computer-readable medium and/or said computer-readable storage medium. The advantages of the proposed computer program products or the associated computer-readable media substantially correspond to the advantages of the proposed methods.

FIG. 1 is a schematic functional block representation of a system 100 for controlling a medical apparatus 1. The system 100 comprises the medical apparatus 1 which is embodied to perform a medical procedure on a patient. The medical procedure can comprise an imaging and/or interventional and/or therapeutic procedure. The system furthermore comprises a speech control apparatus 10.

The medical apparatus 1 can comprise an imaging modality. The imaging modality can generally be embodied to image an anatomical region of a patient when the patient is brought into an acquisition region of the imaging modality. The imaging modality is, for example, a magnetic resonance device, a single-photon emission computed tomography device (SPECT device), a positron emission tomography device (PET device), a computed tomography device, an ultrasound device, an X-ray device or an X-ray device embodied as a C-arm device. The imaging modality can also be a combined medical imaging device comprising any combination of several of the imaging modalities named.

Furthermore, the medical apparatus 1 can have an interventional and/or therapeutic apparatus. The interventional and/or therapeutic apparatus can generally be embodied to perform an interventional and/or therapeutic medical procedure on the patient. For example, the interventional and/or therapeutic apparatus can be a biopsy apparatus for taking a tissue sample, a radiation-emitting or radiotherapeutic apparatus for irradiating a patient, and/or an interventional apparatus for performing an intervention, in particular a minimally invasive intervention. According to some embodiments of the invention, the interventional and/or therapeutic apparatus can be automated or at least partially automated and in particular robot-controlled. The radiation-emitting or radiotherapeutic apparatus can, for example, include a medical linear accelerator or another radiation source. For example, the interventional apparatus can have a catheter robot, a minimally invasive surgical robot, an endoscopy robot, etc.

According to further embodiments, the medical apparatus 1 can additionally or alternatively have units and/or modules that support the performance of a medical procedure, such as, for example, a patient support apparatus that can be controlled in particular in an at least partially automated manner, and/or monitoring devices for monitoring the patient's condition, such as, for example, an ECG device, and/or a patient care device, such as, for example, a ventilator, an infusion device and/or a dialysis device.

According to some embodiments of the invention, one or more components of the medical apparatus 1 are to be controllable by one or more operator speech input types. For this purpose, the system 100 has a speech control apparatus 10 comprising an interface with an acoustic input apparatus 2.

The acoustic input apparatus 2 is used to record or capture an audio signal E1, i.e., to record spoken sounds generated by an operator of the system 100. The input apparatus 2 can, for example, be implemented as a microphone. The input apparatus 2 can, for example, be arranged in a stationary manner on the medical apparatus 1 or elsewhere, such as in a remote control room. Alternatively, the input apparatus 2 can also be embodied as portable, for example as a microphone of a headset that can be carried by the operator. In this case, the input apparatus 2 advantageously has a transmitter 21 for wireless data transmission.

The speech analysis apparatus 10 has an input 31 for receiving signals and an output 32 for providing signals. The input 31 and the output 32 can form an interface facility of the speech analysis apparatus 10. The speech analysis apparatus 10 is generally configured to perform data processing operations and to generate electrical signals.

For this purpose, the speech control apparatus 10 can have at least one computing unit 3. The computing unit 3 can, for example, comprise a processor, for example in the form of a CPU or the like. The computing unit 3 preferably has a first and a second central evaluation unit, for example in each case as an evaluation unit with one or more processors. The computing unit 3 can preferably comprise a control unit embodied to generate control signals for the medical apparatus.

The computing unit 3 can in particular be at least partially embodied as a control computer (also called system control) of the medical apparatus 1 or as part of the same. According to one or more example embodiments of the present invention, the computing unit 3 comprises units or modules embodied to execute a safety function, in particular a standardized safety function (also SIL (safety integrity level) units). The standardized safety function is used to minimize an operating risk of the medical apparatus 1 due to the execution of an incorrectly recognized control command. In particular, the safety function enables the safeguarding of a first failure in the machine recognition of a control command from speech input. According to further implementations, functionalities and components of the computing unit 3 can be distributed in a decentralized manner across a plurality of computing units or control modules of the system 100.

Furthermore, the speech control apparatus 10 has at least one data memory 4, and in particular a non-volatile data memory that can be read by the computing unit 3, such as a hard disk, CD-ROM, DVD, Blu-ray disk, floppy disk, flash memory or the like. The data memory 4 can generally store software P1, P2, configured to prompt the computing unit 3 to perform the steps of a method.

As depicted schematically in FIG. 1, the input 31 of the speech control apparatus 10 is connected to the input apparatus 2. The input can likewise be connected to the medical apparatus 1. The input 31 can be configured for wireless or wired data communication. For example, the input 31 can have a bus port. Alternatively or additionally to a wired port, the input 31 can also have an interface, for example a receiver 34 for wireless data transmission. For example, as depicted in FIG. 1, the receiver 34 can be in data communication with the transmitter 21 of the input apparatus 2. The receiver 34 provided can, for example, be a WIFI interface, a Bluetooth interface or the like.

The output 32 of the speech control apparatus 10 is, on the one hand, connected to the medical apparatus 1. The output 32 can be configured for wireless or wired data communication. For example, the output 32 can have a bus port. Alternatively or additionally to a wired port, the output 32 can also have an interface for wireless data transmission, for example to an online module OM1, for example a WIFI interface, a Bluetooth interface or the like.

The speech control apparatus 10 is configured to generate one or more control signals C1 for controlling the medical apparatus 1 and to provide them at the output 32. The control command C1 prompts the medical apparatus 1 to perform a certain work step or a sequence of steps. For example, using the example of an imaging modality embodied as an MR device, such steps can relate to the performance of a certain scan sequence with a certain excitation of magnetic fields by a generator circuit of the MR device. Furthermore, such steps can relate to the movement of movable system components of the medical apparatus 1, such as, for example, the movement of a patient support apparatus or the movement of emission or detector components of an imaging modality. The steps can in particular relate to the release or start of X-radiation.

To provide the control signal C1, the computing unit 3 can have different modules M1-M3. A first module M1 corresponding to a first evaluation unit is embodied to analyze the audio signal E1 and, on the basis thereof, to provide a first speech analysis result, to recognize a first speech command SSB1 based on the first speech analysis result. In some embodiments, module M1 can also be embodied to assign the first speech command SSB1 to a safety class SK. For this purpose, the module M1 can be embodied to apply a first computational linguistics algorithm P1 to the audio signal E1. In particular, the module M1 is embodied to execute method steps S20 to S40.

The first speech command SSB1 can then be input into a further module M2 corresponding to a second evaluation unit independent of the first evaluation unit. In particular, the first speech command SSB1 is then forwarded to a module M2 if it has been recognized as a safety-critical speech command, in particular a first-failure safety speech command, (for example by the step of assigning it to a safety class SK comprising safety-critical speech commands). Module M2 is embodied to ascertain a verification signal VS to confirm the first speech command SSB1. For this purpose, the module M2 can be embodied to apply a second computational linguistics algorithm P2 to the audio signal E1. Herein, the second computational linguistics algorithm P2 can be embodied to recognize a second speech command SSB2 in the audio signal E1 and to perform a comparison between the first and second speech command SSB1 and SSB2. The second computational linguistics algorithm P2 can also be embodied to recognize at least one keyword or a specific word sequence in the second audio signal E2, which can be linked to a safety-critical speech command.

The second module M2 is in particular embodied to generate a verification signal VS comprising verification information confirming the first speech command SSB1 based on a comparison between the first and second speech command SSB1, SSB2. The verification signal VS can preferably also comprise the first speech command SSB1.

The verification signal VS is given to a third module M3 corresponding to a control unit of the speech control apparatus 10. Module M3 is embodied to provide, based on the verification signal VS and possibly the first speech command SSB1, one or more control signals C1 suitable for controlling the medical apparatus 1 according to the first speech command SSB1.

If the first speech command SSB1 belongs to a safety class SK relating to non-safety-critical speech commands, in some embodiments, the module M2 is not activated. Module M1 then enters the recognized first speech command SSB1 directly into the module M3, for example. Here, verification according to one or more example embodiments of the present invention can be omitted.

Herein, subdivision into modules M1-M3 is only intended to simplify the explanation of the mode of operation of the computing unit 3 and should not be understood to be restrictive. Herein, the modules M1-M3 can in particular also be understood to be computer program products or computer program segments, which, when executed in the computing unit 3, implement one or more of the functions or method steps described below.

Preferably, at least module M2 is embodied as a SIL unit for executing a safety function. According to one or more example embodiments of the present invention, the safety function is directed at checking or confirming the first recognized speech command SSB1 in at least one independent verification loop.

According to a conventional CP structure, module M1 and module M3 together form part of the C-path, while module M2 forms part of the P-path.

Figure 2:
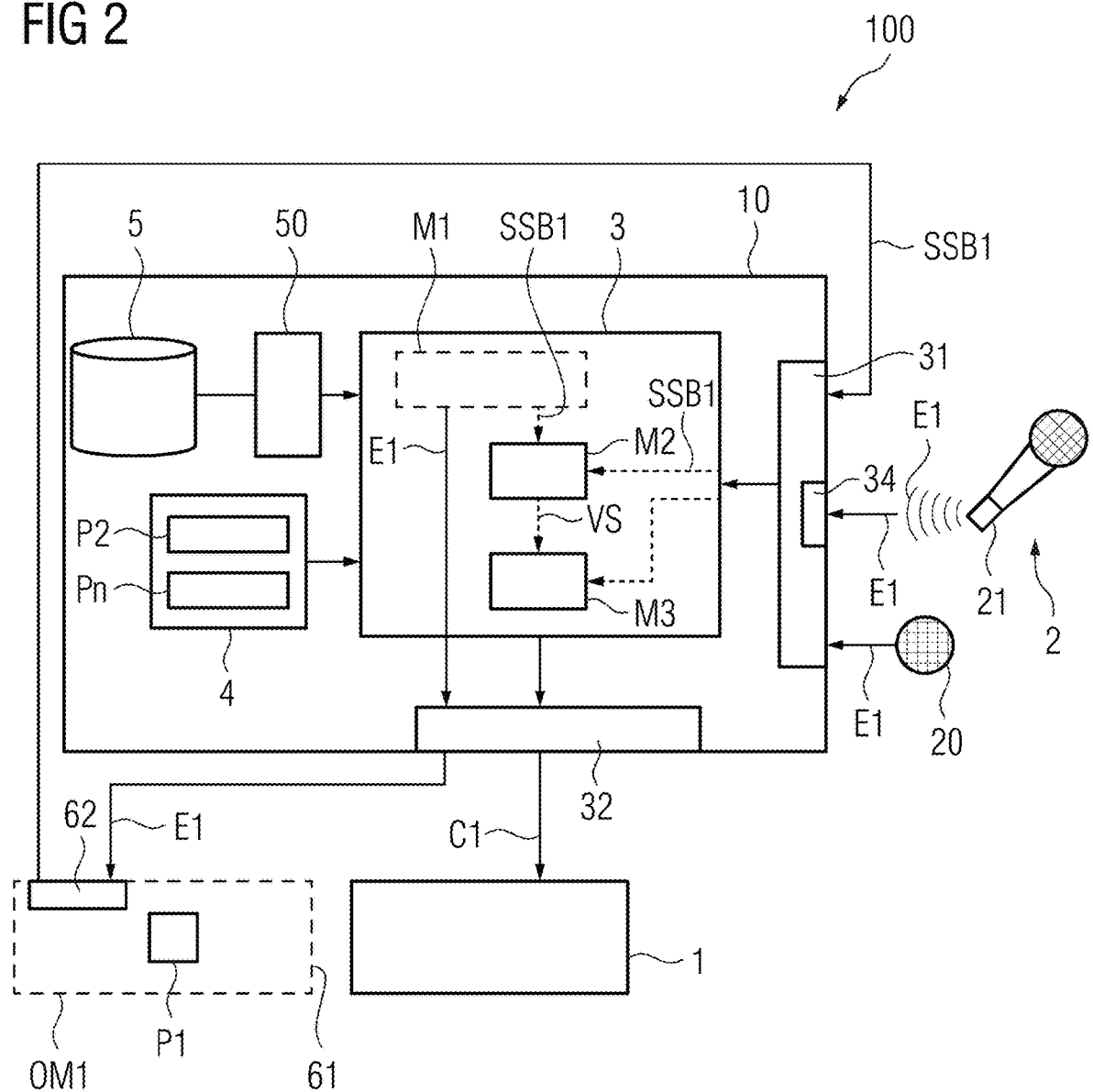
FIG. 2 illustrates a further block diagram of a system for controlling a medical apparatus according to a further embodiment.

FIG. 2 is a schematic functional block representation of a system 100 for performing a medical procedure on a patient according to a further embodiment.

The embodiment shown in FIG. 2 differs from the embodiment shown in FIG. 1 on the one hand in that the functionalities of the module M1 are at least partially outsourced to an online module OM1. Otherwise, the same reference symbols refer to the same components or components with the same function.

The online module OM1 can be stored on a server 61 with which the speech analysis apparatus 10 can enter into data exchange via an Internet connection and an interface 62 of the server 61. Accordingly, the speech control apparatus 10 can be embodied to transmit the audio signal E1 to the online module OM1. The online module OM1 can be embodied, based on the audio signal E1, to ascertain a first speech command SSB1 and possibly the associated safety class and return them to the speech control apparatus 10. Accordingly, the online speech recognition module OM1 can be embodied to make the first computational linguistics algorithm P1 available in a suitable online memory. Herein, the online module OM1 can be understood to be a centralized facility that provides speech recognition services for a plurality of clients, in particular local clients (in this context, the speech control apparatus 10 can be understood as a local client). The use of a central online module OM1 can be advantageous in that more powerful algorithms can be applied and more computing power can be expended.

In alternative implementations, the online speech recognition module OM1 can also "only" return the first speech analysis result SAE1. The first speech analysis result can then, for example, contain machine-usable text into which the audio signal E1 has been converted. Based on this, the module M1 of the computing unit 3 can identify the first speech command SSB1. Such an embodiment can be advantageous if the speech commands SSB1 depend on the circumstances of the medical apparatus 1 which the online module OM1 is unable to access and/or which the online module OM1 has not been prepared to take into account. The capacity of the online module OM1 is then used to create a first speech analysis result, but otherwise the speech commands are determined within the computing unit 3.

However, conversely, according to a further variation, not shown, further functions of the speech analysis apparatus 10 can be executed in a central server. For example, it is conceivable for the second computational linguistics algorithm P2 also to be hosted in an online module.

On the other hand, the embodiment shown here differs from that shown in FIG. 2 in that it has a further acoustic input apparatus 20. This is also used to record or capture the audio signal E1. Herein, the capturing takes place at the same time as or in parallel to the capture of the audio signal E1 via the input apparatus 2. The input apparatus 20 can also be implemented as a microphone, which can be arranged in a stationary manner, detached from the input apparatus 20, directly in a housing of the medical apparatus 1 or elsewhere, such as in a control room. In some embodiments, like input apparatus 2, input apparatus 20 can be embodied for wireless data communication with input 31. Herein, input 31 is embodied to provide the audio signal captured by input apparatus 2 for analyzing and providing the first speech analysis result SAE1 and the audio signal captured via input apparatus 20 for analyzing and providing the second speech analysis result SAE2. Thus, failures with the capturing of the signal, i.e., registration, digitization and/or storage of the speech input, are advantageously limited to one evaluation path of the audio signal.

In the system 100 shown by way of example in FIG. 1, the medical apparatus 1 is controlled by a method depicted as a flow diagram in FIG. 3 by way of example. The order of the method steps is not restricted either by the sequence depicted or by the numbering selected. For example, if necessary, the order of the steps can be interchanged. In some embodiments, individual steps can be performed in parallel. Once again, individual steps can be omitted.

Generally, herein, it is provided that the operator operating the medical apparatus 1 voices or speaks a command, for example by saying a sentence such as, for example, "Start X-ray image recording" or "Bring the patient to the starting position", the input apparatus 2 and possibly the input apparatus 20 captures and processes an associated audio signal E1 and the speech control apparatus 10 analyzes the captured audio signal E1 and generates a corresponding control command C1 for actuating the medical apparatus 1. One advantage of this approach is that the operator can also perform other tasks while speaking, for example the preparation of the patient. This advantageously speeds up the workflow. Furthermore, this enables the medical apparatus 1 to be at least partially controlled in a "contactless" manner thus improving hygiene at the medical apparatus 1.

The method for speech control of the medical apparatus 1 comprises steps S10 to S70. The steps are preferably executed with the speech control apparatus 10. In step S10, an audio signal E1 containing operator speech directed at controlling the apparatus 1 is captured via the input apparatus 2. In some embodiments, in step S10, the audio signal E1 is simultaneously captured by the input apparatus 20.

The audio signal E1 is provided to the speech control apparatus 10 via the input 31. A step S20 comprises analyzing the audio signal E1 to provide a first speech analysis result SAE1. For this purpose, in particular, the audio signal captured via the input apparatus 2 can be provided. Therefore, step 20 comprises providing a speech utterance relevant for controlling the medical apparatus as a first speech analysis result SAE1 from the audio signal E1. The generation of the speech analysis result can comprise a plurality of substeps.

One substep can be directed at first converting the sound information contained in the audio signal E1 into text information, i.e., generating a transcript. One substep can be directed at tokenizing the audio signal E1 or the operator speech input or the transcript T. Herein, tokenization refers to segmentation of the speech input, i.e., the spoken text, into units at word or sentence level. Accordingly, the first speech analysis result SAE1 can comprise first tokenization information that indicates, for example, whether or not the operator has finished speaking a current sentence.

One substep can be directed at additionally or alternatively executing semantic analysis of the audio signal E1 or the operator speech input or the transcript T. Accordingly, the first speech analysis result SAE1 can comprise first semantic information about the operator speech input. Herein, the semantic analysis is directed at assigning a meaning to the speech input. For this purpose, for example, a word-by-word-wise or word-group-by-word-group-wise comparison can be made with a general word and/or speech command database 5 or one that is specific to the medical apparatus 1 or a word library and/or speech command library 50 of the medical apparatus 1 or the system 100 according to one or more example embodiments of the present invention. In particular, in this step, for example, one or more statements contained in a command library 50 of the medical apparatus 1 can be assigned to the transcript T according to different speech commands. Thus, it is possible to recognize a user intention directed at a speech command.

The substeps described can be executed by a speech understanding module included in module M1; in particular these substeps can be executed by the online module OM1.

In step S30, a first speech command SSB1 is recognized based on the first speech analysis result SAE1. Here, in particular the semantic information representing a user intention is used in order to assign a corresponding speech command as a first speech command SSB1. In other words, the recognized speech command is assigned to one of numerous possible command classes, wherein different modes of expression, words, word sequences or word combinations representing the user intention corresponding to the speech command can be stored for a command class. Step S30 can also comprise a comparison of the first speech analysis result SAE1 with a command database 5 or command library 50.

In an optional step S40, the first speech command SSB1 is assigned to a safety class SK. Here, according to one or more example embodiments of the present invention, at least one safety class for safety-critical speech commands is provided to which the first speech command SSB1 belongs. Herein, each speech command can be assigned to a safety class SK via a conventional lookup table or another assignment rule. According to one or more example embodiments of the present invention, now at least one of the possible safety classes is provided for safety-critical speech commands, the execution of which by the medical apparatus 1 must satisfy specific, in particular standardized, safety requirements. In particular, this comprises speech commands the execution of which must be implemented in a first-failure safe manner.

Steps S20 to S40 can, for example, be implemented by software P1 stored on the data memory 4 and which prompts the computing unit 3, in particular module M1 or online module OM1, to perform these steps. The software P1 can comprise a first computational linguistics algorithm comprising a first trained function which is applied to the audio signal, in particular for analyzing the audio signal E1; this will be explained in more detail with reference to FIGS. 4 and 5. In this way, one or more example embodiments of the present invention implements a conventional CP architecture C-path.

In step S50, a verification signal VS for confirming the first speech command SSB1 is ascertained. The verification signal VS is ascertained based on the captured audio signal E1. For step S50, preferably, the audio signal captured via the input apparatus 20 can be provided. According to one or more example embodiments of the present invention, the verification signal VS can be ascertained in a plurality of substeps, as will be explained in more detail with reference to FIG. 4. Substeps S51 to S54 of S50 are directed at analyzing the audio signal for providing a second speech analysis result SAE2, at recognizing a second operator speech command SSB2 based on the second speech analysis result and at comparing the first and second speech command.

The verification signal is ascertained according to one or more example embodiments of the present invention with the independent module M2 of the computing unit 3. In this way, the invention implements an independent P-path to safeguard safety-critical speech commands, wherein, according to the invention, a corresponding safety function is based on a speech command obtained via machine speech processing methods.

Whereas step S50 is executed on the audio signal captured via the input apparatus 20 or input apparatus 2, steps S20 to S40 are executed on the audio signal captured via the input apparatus 2.

In some embodiments, step S50 can be executed in parallel with, i.e., at the same time as, steps S20 to S40. Alternatively, step S50 can be executed subsequent to steps S20 to S40. In some embodiments, step S50 can be executed for each control command as the first speech command SSB1 in step S40. In preferred embodiments, step S50 is executed in dependence on step S40, namely if the first speech command SSB1 has been identified by assignment to a safety class SK as a speech command comprising a safety-critical speech command, in particular as a first-failure safe speech command.

In step S60, a control signal C1 for controlling the medical apparatus is generated based on the verification signal VS or the first speech command SSB1 provided that the first speech command SSB1 has been confirmed in step S50. The control signal C1 is then suitable for controlling the medical apparatus 1 according to the first speech command SSB1. The first speech command SSB1 can be transferred in the form of an input variable or as part of the verification signal VS to the module M3 of the computing unit 3 (or corresponding software stored, for example, on the data memory 4) and at least one control signal C1 is derived therefrom. In a step S70, the control signal C1 is input or transferred into the medical apparatus 1 via the output 32.

FIG. 4 is a flow diagram for ascertaining a verification signal VS for the first speech command SSB1 in one embodiment of the invention. Here, confirmation of the first speech command SSB1 takes place without further user interaction. In other words, the invention enables a particularly simple and quick operation of the medical apparatus 1 with only one initial speech input in the sense of the audio signal E1.

The steps depicted in FIG. 5, the order of which is likewise not mandatorily determined by the sequence, can take place in the framework of step S50 in FIG. 3. Accordingly, therefore, step S50, i.e., ascertaining the verification signal VS, also comprises the following steps.

Step S51 is directed at analyzing the audio signal E1 to provide a second speech analysis result SAE2 and step S52 is directed at recognizing a second speech command SSB2 based on the second speech analysis result SAE2.

Steps S51 to S54 are implemented by software P2 stored on the data memory 4 which prompts the computing unit 3, in particular module M2, to perform these steps. The software P2 can comprise a second computational linguistics algorithm P2 comprising a second trained function, which like software P1, is also applied to the audio signal E1, in particular for analyzing the audio signal E1.

Step S51 can likewise comprise tokenization of the audio signal E1 and/or semantic analysis of the audio signal E1. Accordingly, the second speech analysis result SAE2 can also comprise second tokenization information or second semantic information.

The second computational linguistics algorithm P2 can advantageously comprise a second trained function. It is characteristic of the present invention that the first trained function and the second trained function are different from one another. In particular, the second trained function is embodied only to identify safety-critical speech commands, in particular speech commands that are to feature first-failure safety, in the audio signal E1.

On the other hand, the first trained function is embodied to recognize a very broad vocabulary relating to a wide variety of operator speech types and in particular also non-safety-critical speech commands. In this sense, the second trained function is embodied as specific to safety-critical speech commands. Therefore, the second trained function does not recognize non-safety-critical speech commands or general speech input. In this respect, at least step S52-2 is specific to recognizing a safety-critical speech command as the second speech command SSB2.

Safety-critical speech commands are characterized by a characteristic feature combination, consisting, for example, of the frequency pattern, amplitude, modulation, or the like. In addition, safety-critical speech commands, in particular first-failure safety speech commands, in particular have a minimum number of syllables of three or more. The greater the number of syllables in a speech command, the easier it is to distinguish from other speech commands. This minimizes the risk of confusion with other speech commands.

The specificity of steps S52-1 and S52-2 is achieved in that the second trained function is embodied differently from the first trained function. A key difference between the first and second trained function can be between the training data used in each case. The first training data set for the first trained function comprises a broad and diverse vocabulary with respect to a wide variety of speech commands or general speech input. On the other hand, the second training data set for the second trained function is limited to a vocabulary directed at specific speech commands, in particular phonetically unique speech commands, in order to be able to recognize safety-critical speech commands, in particular first-failure safety speech commands, unambiguously with a low failure rate. In this respect, according to the invention, the second trained function can be trained via a small training vocabulary and, in contrast, the first trained function can be trained with a large training vocabulary.

For example, the first training data set can comprise a large number of speech input types with respect to two functions or work steps of the medical apparatus 1. A first function can relate to safety-critical starting of an X-ray image recording. The input data of the first training data set can, for example, comprise the following types of speech input: "New Scan!", "Please, start a new scan!", "Let's do a new acquisition now!", "Will you perform a scan for me?" or the like. The corresponding output data of the first training data set is limited to the one speech command "Perform acquisition!". Therefore, the first trained function is trained to classify all the speech input types into the same command class comprising the speech command "Perform acquisition!". Herein, the first trained function can also be embodied for further generalization so that it would also, for example, assign the speech input "Let's do a new performance for me!" to the aforementioned speech command.

A second function can, for example, relate to non-safety-critical starting of a fan of the medical apparatus 1. The input data of the first training data set can, for example, comprise the following types of speech input: "Start fan!", "Switch on the fan!", "OK, activate the fan!" or the like. The corresponding output data of the first training data set is limited to the one speech command "Start fan!". Furthermore, the first trained function is trained to classify all these speech input types into the further command class comprising the speech command "Start fan!".

Accordingly, the first training data can comprise a very large number of further input data types and output data types relating to further, in particular arbitrary, speech commands and other types of input.

The second trained function is in particular embodied to use the second tokenization information and/or second semantic information to identify structurally and/or lexically unique speech commands as safety-critical speech commands. The structural properties and/or lexical properties of the audio signal E1 are ascertained in substep S51. Herein, characteristic unique structural and/or lexical properties are linked to safety-critical speech commands in order to be able to easily and reliably identify them as such.

In this sense, in a particularly preferred embodiment, the second trained function is embodied to identify a speech command with at least three, preferably four, syllables as a safety-critical speech command in order to reduce the risk of confusing safety-critical speech commands. Therefore, particularly preferably, safety-critical work steps of the apparatus are assigned speech commands comprising at least three syllables, particularly preferably, speech commands comprising five to seven syllables.

Therefore, the second trained function is trained only to classify specific speech input as a safety-critical speech command. In particular, the second trained function can be trained to recognize one or more keywords or word sequences.

Consequently, for output data corresponding to a safety-critical speech command, the second training data set comprises exactly one speech input corresponding to input data. According to the invention, the speech input is now selected as structurally, lexically and/or phonetically unique speech input in order to avoid confusion with further speech input.

In the above example relating to the safety-critical function of the medical apparatus 1 for starting X-ray image recording, the second training data set now comprises as speech input "Perform Acquisition" and as output data corresponding to the safety-critical speech command "Perform Acquisition". Particularly preferably, the speech input can comprise a trigger or start term, for example in the sense of "Siemens, perform Acquisition", wherein Siemens represents the specific trigger term.

An alternative possible speech command for releasing X-radiation could also be: "Start Scan!". However, because of its acoustic similarity to "Start Fan", this is very easy to confuse. A further alternative speech command could be "New Scan!". However, with two syllables, this is also easily confused and could be captured as part of general speech input and incorrectly recognized as a speech command, for example as part of the speech input "When the patient is in we're doing a new scan immediately".

On the other hand, the speech command "Perform Acquisition" is difficult to confuse, both because of its acoustic features and its seven syllables and it is therefore particularly well suited as a safety-critical speech command.

According to the invention, the trained functions themselves can differ, especially in the embodiment of the verification function or the classification function. The first trained function has a large number of categories corresponding to a large number of different speech commands. On the other hand, the second trained function is limited to a lower number of categories corresponding to a small number of safety-critical speech commands, in particular specific to the medical apparatus. By using different types of trained functions, the invention reduces the risk of occurrence of similar systematic failures in speech command recognition by the first trained function and the second trained function.

Therefore, if in step S52, the second trained function identifies a speech command as the second speech command SSB2 from the second speech analysis result SAE2, this is per se a safety-critical speech command.

In this embodiment, due to the different embodiment of the first and second trained functions, the risk of executing a first speech command SSB1 incorrectly recognized in the module M1 is minimized since systematic speech command recognition failures of the first trained function are very unlikely to be repeated by the second trained function.

In a step S53, the conformity between the first and second speech command SSB1, SSB2 is now checked with reference to a conformity criterion ÜK. Herein, a conformity measure between the two speech commands is compared with a predefined threshold value specific to the first and/or second speech command SSB1/SSB2. The threshold value or the required similarity measure can vary from speech command to speech command. According to the invention, threshold values of speech commands of a high safety level, i.e., in particular speech commands that are to feature first-failure safety, are embodied larger than speech commands of a lower safety level.

If test step S53 reveals that the first and second speech command SSB1, SSB2 have a conformity measure at or above the threshold value, the first speech command SSB1 is confirmed.

In step S54, module M2 of the speech control apparatus 10 further generates a verification signal VS based on the test result from step S53. The verification signal VS is then transmitted to module M3 corresponding to the control unit of the speech control apparatus 10, which (in step S60 in FIG. 3) generates the control signal C1 according to the first speech command SSB1 confirmed via the verification signal VS.

Therefore, in the above example of the safety-critical speech command for starting X-ray image recording, the medical apparatus would only release X-radiation if the operator says "Perform Acquisition" as speech input.

FIG. 6 shows an artificial neural network 400 such as can be used in methods according to FIGS. 3 to 4. In particular, the neural network 400 shown can be the first or second trained function of the first or the second computational linguistics algorithm P1, P2. The neural network 400 responds to input values to a large number of input nodes $x_i$ 410 that are applied in order to generate one or a large number of outputs $o_j$. In this exemplary embodiment, the neural network 400 learns by adjusting the weighting factors wi (weights) of the individual nodes based on training data. Possible input values of the input nodes xi 410 can, for example, be speech input or audio signals of a first or second training data set. The neural network 400 weights 420 the input values 410 based on the learning process. In some embodiments, the output values 440 of the neural network 400 correspond to a first or a second speech command SSB1, SSB2. In other embodiments, the output values 440 of the neural network can also comprise an indication of a safety class SK of the first speech command SSB1 or a result of a check of a conformity criterion between the first and second speech command SSB1, SSB2. The output 440 can take place via a single output node or a large number of output nodes oj.

The artificial neural network 400 preferably comprises a hidden layer 430 comprising a large number of nodes hj. A plurality of hidden layers hjn can be provided, wherein a hidden layer 430 uses output values of another (hidden) layer 430 as input values. The nodes of a hidden layer 430 perform mathematical operations. Herein, an output value of a node hj corresponds to a non-linear function f of its input values xi and the weighting factors wi. After receiving input values xi, a node hj performs a summation of a multiplication of each input value xi weighted by the weighting factors wi as determined by the following function:

$$h_j = f(\Sigma_i x_i \cdot w_{ij})$$

In particular, an output value of a node hj is formed as a function f of node activation, for example a sigmoid function or a linear ramp function. The output values hj are transmitted to the output node(s) oj. Once again, summation of a weighted multiplication of each output value hj is calculated as a function of the node activation f:

$$o_j = f(\Sigma_i h_i \cdot w'_{ij})$$

The neural network 400 shown here is a feedforward neural network, such as is preferably used for the first computational linguistics algorithm P1 in which all nodes 430 process the output values of a previous layer in the form of their weighted sum as input values. In particular for the second computational linguistics algorithm, according to the invention, other neural network types can be used, for example a feedback neural network or for example a self-learning (also called recurrent) neural network, in which an output value of a node hj can simultaneously also be its own input value.

The neural network 400 is preferably trained via a supervised training method in order to recognize patterns. One known approach is back-propagation, which can be applied in all exemplary embodiments of the invention. During the training, the neural network 400 is applied to training input values and has to generate corresponding output values known in advance. Iteratively, mean square errors ("MSE") between calculated and expected output values are calculated and individual weighting factors 420 are adjusted until the discrepancy between calculated and expected output values is below a predetermined threshold.

Where not explicitly done, but advisable and in the spirit of the invention, individual exemplary embodiments, individual aspects or features thereof can be combined or interchanged without departing from the scope of the present invention. Where transferrable, advantages of the invention described with reference to one exemplary embodiment also apply without explicit reference to other exemplary embodiments.

The invention enables the use of computational linguistics algorithms comprising neural networks for speech recognition and derivation of speech commands in safety-relevant applications, which must in particular be embodied as first-failure safe. Tests have proven that the described solution is more reliable than conventionally implemented speech recognition algorithms without a safety function. In some embodiments, the invention is characterized by scalability with respect to user friendliness and/or safety (failure detection). On the one hand, this can be used to safeguard speech commands of different safety levels appropriately in each case. On the other hand, it is possible to improve usability over time if experience has shown that speech command recognition or speech command verification in a defined target environment corresponds to desired safety specifications and sufficient reliability has been demonstrated. Alternatively, it is possible to increase safety if it has been recognized that, for example due to special ambient conditions (for example background noise), reliable recognition of commands transmitted by speech input is not working sufficiently well.

Scalability generally enables a gradual change of resilience in terms of safety between conventionally implemented components and components implemented via methods of machine learning. This can create a migration path toward the use of computational linguistics algorithms comprising neural networks that is resilient in terms of safety.

Finally, reference is made to the fact that the embodiment of a verification mechanism according to the invention for control commands derived via speech recognition can be applied with respect to an incorrect interpretation of recognized commands (a user intention comprising speech input is assigned an incorrect speech command) or with respect to an untimely, i.e., too slow, recognition of speech commands. However, according to the invention, a failure with which no speech command is recognized with the first computational linguistics algorithm in a speech input despite its containing a user intention cannot be safeguarded. Therefore, the present invention is not suitable for safeguarding an emergency-stop function, for example.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for speech control of a medical apparatus, the method comprising:
   capturing an audio signal containing operator speech input for controlling the medical apparatus;
   first analyzing the audio signal to obtain a first speech analysis result;

recognizing a first speech command from the operator based on the first speech analysis result;
ascertaining a verification signal for the first speech command, the ascertaining including,
    second analyzing the audio signal to obtain a second speech analysis result, the second analyzing including applying a computational linguistics algorithm to the audio signal, and the computational linguistics algorithm being configured to only recognize safety-critical speech commands,
    recognizing a second speech command from the operator based on the second speech analysis result, and
    comparing the first speech command and the second speech command to obtain a comparison result,
the verification signal confirming the first speech command based on the comparison result satisfying a conformity criterion;
generating a control signal for controlling the medical apparatus based on the verification signal, the control signal being configured to control the medical apparatus according to the first speech command; and
inputting the control signal into the medical apparatus.

2. The method of claim 1, wherein
the computational linguistics algorithm is a first computational linguistics algorithm;
the first analyzing includes applying a second computational linguistics algorithm to the audio signal, the second computational linguistics algorithm including a first trained function;
the first computational linguistics algorithm including a second trained function; and
the first trained function and the second trained function are different from one another.

3. The method of claim 2, wherein the second trained function is configured only to recognize the safety-critical speech commands.

4. The method of claim 3, wherein
the first analyzing includes tokenizing for segmenting at least one segmenting letters, words or sentences within the audio signal via the second computational linguistics algorithm to obtain first tokenization information, the first speech analysis result including the first tokenization information; and
the second analyzing includes tokenizing for segmenting at least one of letters, words or sentences within the audio signal via the first computational linguistics algorithm to obtain second tokenization information, the second speech analysis result including the second tokenization information.

5. The method of claim 4, wherein
the first analyzing includes semantic analysis of the audio signal via the second computational linguistics algorithm to obtain first semantic information, the first speech analysis result including the first semantic information; and
the second analyzing includes semantic analysis of the audio signal via the first computational linguistics algorithm to obtain second semantic information, the second speech analysis result including the second semantic information.

6. The method of claim 5, wherein the first trained function is configured to use at least one of the second tokenization information or the second semantic information to identify at least one of:
structurally unique speech commands as the safety-critical speech commands, or
lexically unique speech commands as the safety-critical speech commands.

7. The method of claim 5, wherein the first trained function is configured to identify a speech command with at least three syllables as one of the safety-critical speech commands.

8. The method of claim 2, further comprising:
classifying the first speech command into one among of a plurality of safety classes, at least one first safety class among the plurality of safety classes corresponding to the safety-critical speech commands,
wherein the ascertaining of the verification signal for the first speech command is performed based on the first speech command being classified in the at least one first safety class.

9. The method of claim 1, wherein the capturing of the audio signal includes:
capturing the audio signal via a first input apparatus and a second input apparatus, the first input apparatus and the second input apparatus being different from one another,
wherein
    the first analyzing is performed using the audio signal captured via the first input apparatus, and
    the second analyzing is performed using the audio signal captured via the second input apparatus.

10. A non-transitory computer-readable storage medium storing program sections that, when executed by a system, cause the system to perform the method of claim 1.

11. The method of claim 1, wherein
the computational linguistics algorithm is a first computational linguistics algorithm;
the first analyzing includes tokenizing for segmenting at least one of letters, words or sentences within the audio signal via a second computational linguistics algorithm to obtain first tokenization information, the first speech analysis result including the first tokenization information; and
the second analyzing includes tokenizing for segmenting at least one of letters, words or sentences within the audio signal via the first computational linguistics algorithm to obtain second tokenization information, the second speech analysis result including the second tokenization information.

12. The method of claim 2, wherein
the first analyzing includes tokenizing for segmenting at least one of letters, words or sentences within the audio signal via the second computational linguistics algorithm to obtain first tokenization information, the first speech analysis result including the first tokenization information; and
the second analyzing includes tokenizing for segmenting at least one of letters, words or sentences within the audio signal via the first computational linguistics algorithm to obtain second tokenization information, the second speech analysis result including the second tokenization information.

13. The method of claim 3, further comprising:
classifying the first speech command into one among a plurality of safety classes, at least one first safety class among the plurality of safety classes corresponding to the safety-critical speech commands,
wherein the ascertaining of the verification signal for the first speech command is performed based on the first speech command being classified in the at least one first safety class.

14. The method of claim 4, further comprising:
classifying the first speech command into one among a plurality of safety classes, at least one first safety class among the plurality of safety classes corresponding to the safety-critical speech commands,
wherein the ascertaining of the verification signal for the first speech command is performed based on the first speech command being classified in the at least one first safety class.

15. The method of claim 5, further comprising:
classifying the first speech command into one among a plurality of safety classes, at least one first safety class among the plurality of safety classes corresponding to the safety-critical speech commands,
wherein the ascertaining of the verification signal for the first speech command is performed based on the first speech command being classified in the at least one first safety class.

16. The method of claim 2, wherein
the first analyzing includes semantic analysis of the audio signal via the second computational linguistics algorithm to obtain first semantic information, the first speech analysis result including the first semantic information; and
the second analyzing includes semantic analysis of the audio signal via the first computational linguistics algorithm to obtain second semantic information, the second speech analysis result including the second semantic information.

17. A speech control apparatus for speech control of a medical apparatus comprising:
a first interface configured to capture an audio signal containing operator speech input for controlling the medical apparatus;
a first evaluation unit configured to
analyze the audio signal to obtain a first speech analysis result,
recognize a first speech command from the operator based on the first speech analysis result;
a second evaluation unit configured to
ascertain a verification signal for the first speech command by
analyzing the audio signal to obtain a second speech analysis result, the analyzing including applying a computational linguistics algorithm to the audio signal, and the computational linguistics algorithm being configured to only recognize safety-critical speech commands,
recognizing a second speech command from the operator based on the second speech analysis result, and
comparing the first speech command and the second speech command to obtain a comparison result,
the verification signal confirming the first speech command based on the comparison result satisfying a conformity criterion;
a control unit configured to
generate a control signal for controlling the medical apparatus based on the verification signal confirming the first speech command, the control signal being configured to control the medical apparatus according to the first speech command; and
a second interface configured to input the control signal into the medical apparatus.

18. The speech control apparatus of claim 17, wherein the first evaluation unit and the second evaluation unit are computing units separate from one another.

19. The speech control apparatus of claim 17, wherein the first interface comprises a first input apparatus and a second input apparatus for simultaneously capturing the audio signal.

20. A medical system comprising:
the speech control apparatus of claim 17, and
the medical apparatus.

* * * * *